(12) United States Patent
Takeuchi

(10) Patent No.: US 8,909,030 B2
(45) Date of Patent: Dec. 9, 2014

(54) PLAYBACK DEVICE, PLAYBACK METHOD, PROGRAM, AND INTEGRATED CIRCUIT

(71) Applicant: Panasonic Corporation, Osaka (JP)

(72) Inventor: Tatsuya Takeuchi, Hiroshima (JP)

(73) Assignee: Panasonic Corporation, Osaka (JP)

( * ) Notice: Subject to any disclaimer, the term of this patent is extended or adjusted under 35 U.S.C. 154(b) by 71 days.

(21) Appl. No.: 13/820,858

(22) PCT Filed: Oct. 30, 2012

(86) PCT No.: PCT/JP2012/006956
§ 371 (c)(1),
(2), (4) Date: Mar. 5, 2013

(87) PCT Pub. No.: WO2013/108316
PCT Pub. Date: Jul. 25, 2013

(65) Prior Publication Data
US 2014/0064703 A1 Mar. 6, 2014

(30) Foreign Application Priority Data
Jan. 16, 2012 (JP) .................. 2012-006471

(51) Int. Cl.
| | |
|---|---|
| H04N 9/80 | (2006.01) |
| G11B 27/00 | (2006.01) |
| H04N 5/783 | (2006.01) |
| H04N 21/426 | (2011.01) |
| H04N 21/432 | (2011.01) |
| H04N 21/472 | (2011.01) |
| H04N 21/858 | (2011.01) |
| H04N 5/85 | (2006.01) |
| H04N 9/804 | (2006.01) |

(52) U.S. Cl.
CPC .............. *G11B 27/007* (2013.01); *H04N 5/783* (2013.01); *H04N 21/42646* (2013.01); *H04N 21/4325* (2013.01); *H04N 21/47217* (2013.01); *H04N 21/858* (2013.01); *H04N 5/85* (2013.01); *H04N 9/8042* (2013.01); *G11B 2220/2541* (2013.01)
USPC ........................................... 386/248

(58) Field of Classification Search
CPC ....... H04N 5/783; H04N 5/93; H04N 9/8042; G11B 27/007
See application file for complete search history.

(56) References Cited

U.S. PATENT DOCUMENTS

| | | | |
|---|---|---|---|
| 6,434,097 B1 | 8/2002 | Lewis et al. | |
| 2006/0140079 A1 | 6/2006 | Hamada et al. | |
| 2007/0091733 A1 | 4/2007 | Kawahara | |
| 2009/0129752 A1* | 5/2009 | Yamada et al. | 386/102 |

FOREIGN PATENT DOCUMENTS

| | | |
|---|---|---|
| JP | 2002-520972 | 7/2002 |
| JP | 2002-232850 | 8/2002 |

(Continued)

*Primary Examiner* — Huy T Nguyen
(74) *Attorney, Agent, or Firm* — Greenblum & Bernstein, P.L.C.

(57) ABSTRACT

A playback device performs playback of a digital stream and executes an application, the digital stream and the application being included in a title recorded on a recording medium, wherein the title has events set therein for executing the application during the digital stream, and; the playback device comprises: a repeat range input unit receiving input of a repeat range pertaining to the digital stream; an event specification unit specifying one of the events that is within the repeat range input to the repeat range input unit and associated with a time closest to an end time of the repeat range; an adjustment unit creating an adjusted repeat range by adjusting the end time of the repeat range to a time preceding the time of the event specified by the event specification unit; and a playback unit performing repeat playback of the digital stream over the adjusted repeat range.

12 Claims, 33 Drawing Sheets

(56) References Cited

FOREIGN PATENT DOCUMENTS

| | | |
|---|---|---|
| JP | 2004-040705 | 2/2004 |
| JP | 2007-115349 | 5/2007 |
| JP | 2007-122759 | 5/2007 |
| JP | 4392644 | 1/2010 |
| JP | 2010-272189 | 12/2010 |
| JP | 2012-099192 | 5/2012 |
| WO | 2005/052940 | 6/2005 |

* cited by examiner

Blu-ray Disc

FIG. 12

| titleStartMT(pts) | 0 |
|---|---|
| titleEndMT(pts) | 135000000 |
| mk_num | 6 |
| mk[0] (pts) | 0 |
| mk[1] (pts) | 27000000 |
| mk[2] (pts) | 54000000 |
| mk[3] (pts) | 81000000 |
| mk[4] (pts) | 108000000 |
| mk[5] (pts) | 134955000 |
| chp_num | 5 |
| chp[0] (pts) | 0 |
| chp[1] (pts) | 27000000 |
| chp[2] (pts) | 54000000 |
| chp[3] (pts) | 81000000 |
| chp[4] (pts) | 108000000 |

FIG. 13

| mt_num | 3000 |
|---|---|
| mt[0] (pts) | 0 |
| mt[1] (pts) | 45000 |
| ..... | ..... |
| mt[2998] (pts) | 134910000 |
| mt[2999] (pts) | 134957000 |

FIG. 14

| lastLength | 45000 |
|---|---|
| adjMT | 1875 |

FIG. 15

| startMT | 81000000 |
|---|---|
| endMT | 134955125 |

Repeat range set by user

Repeat range after adjustment execution

Repeat range set by user

Repeat range after adjustment execution

Repeat range set by user

Repeat range after adjustment execution

FIG. 32

| title_num | 1 |
|---|---|
| title_type[0] | 1 |
| title_type[1] | −1 |
| ..... | ..... |
| title_type[998] | −1 |

PLAYBACK DEVICE, PLAYBACK METHOD, PROGRAM, AND INTEGRATED CIRCUIT

TECHNICAL FIELD

The present disclosure relates to repeat playback technology for a digital stream.

BACKGROUND ART

Presently, playback devices having repeat playback capabilities are widely available. Repeat playback is a form of playback in which a specific interval of a digital stream is played back repeatedly.

Repeat playback technology has been the topic of several improvements to date, such as improving the usability of repeat range setting operations, as widely known and disclosed in Patent Literature 1 and 2.

CITATION LIST

Patent Literature

[Patent Literature 1]
Japanese Patent Application Publication No. 2004-040705
[Patent Literature 2]
Japanese Patent Application Publication No. 2007-115349
[Patent Literature 3]
International Patent Application Publication No. 2005/052940

SUMMARY OF INVENTION

Technical Problem

On a BD-ROM (Blu-ray Disc Read-Only Memory) and similar, a Java™ application is recorded along with a digital stream, and playback control is performed on the digital stream by executing the Java™ application (e.g., Patent Literature 3).

However, conventional repeat playback technology does not take the application recorded on the recording medium into consideration. As such, there is a risk of conflict between the application on the recording medium and the repeat playback process by the playback device.

The present disclosure takes this situation into consideration, and aims to provide a playback device able to perform repeat playback without conflict between the application recorded on the recording medium and the playback process by the playback device.

Solution to Problem

In order to achieve the above-stated aim, a playback device pertaining to one aspect of the disclosure performs playback of a digital stream and executes an application, the digital stream and the application being included in a title recorded on a recording medium, wherein the title has a plurality of events set therein for executing the application during the digital stream, and; the playback device comprises: a repeat range input unit receiving input of a repeat range pertaining to the digital stream; an event specification unit specifying one of the events that is within the repeat range input to the repeat range input unit and associated with a time closest to an end time of the repeat range; an adjustment unit creating an adjusted repeat range by adjusting the end time of the repeat range to a time preceding the time of the event specified by the event specification unit; and a playback unit performing repeat playback of the digital stream over the adjusted repeat range.

Advantageous Effects of Invention

According to one aspect of the playback device, an event in the designated repeat range is specified as being associated with a time closest to the end of the repeat range and thus prone to conflict with the repeat playback process. Then, adjusting the end time of the repeat range to a point preceding the specified event enables prevention of the occurrence of events highly likely to employ control processes pertaining to playback, such as black-screen display and resolution changes by the application recorded on the recording medium. Accordingly, stable repeat playback is realised without conflict between the application recorded on the recording medium and the repeat playback process by the playback device.

BRIEF DESCRIPTION OF DRAWINGS

FIG. 12 indicates the content of playlist information.
FIG. 13 indicates the content of a media time event settings table.
FIG. 14 indicates the content of an adjustment parameter.
FIG. 15 indicates the content of a repeat range table.

FIG. 32 indicates the content of a title type table.

DESCRIPTION OF EMBODIMENTS

Overview of Embodiments

Figure 1:
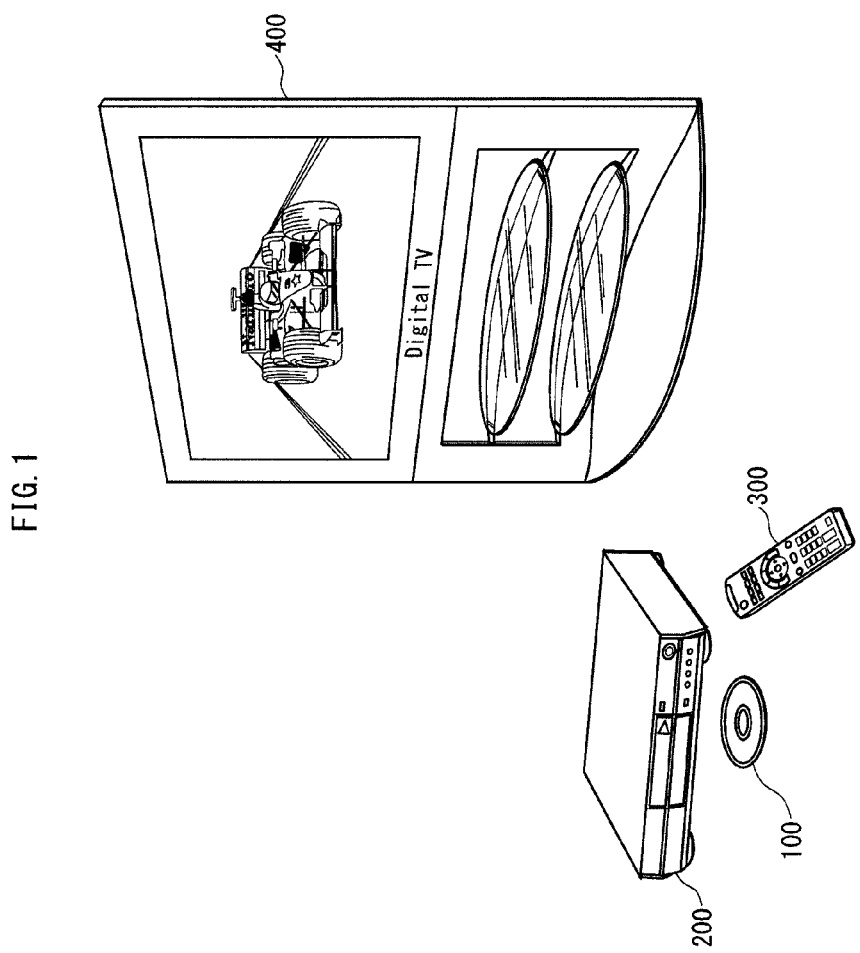
FIG. 1 illustrates a home theatre system that includes a playback device.

In one aspect, a playback device performs playback of a digital stream and executes an application, the digital stream and the application being included in a title recorded on a recording medium, wherein the title has a plurality of events set therein for executing the application during the digital stream, and; the playback device comprises: a repeat range input unit receiving input of a repeat range pertaining to the digital stream; an event specification unit specifying one of the events that is within the repeat range input to the repeat range input unit and associated with a time closest to an end time of the repeat range; an adjustment unit creating an adjusted repeat range by adjusting the end time of the repeat range to a time preceding the time of the event specified by the event specification unit; and a playback unit performing repeat playback of the digital stream over the adjusted repeat range.

Thus, an event in the designated repeat range is specified that is associated with a time closest to the end of the repeat range, and is thus prone to conflict with the repeat playback process. Then, adjusting the end time of the repeat range to a point preceding the specified event enables prevention of the occurrence of events highly likely to employ control processes pertaining to playback, such as black-screen display and resolution changes by the application recorded on the recording medium. Accordingly, stable repeat playback is realised without conflict between the application recorded on the recording medium and the repeat playback process by the playback device.

In another aspect of the playback device, the digital stream is made up of a plurality of playback intervals, and the adjustment unit executes the adjustment when an interval from the time of the event specified by the event specification unit to an end time of one of the playback intervals is equal to or shorter than a predetermined interval.

Accordingly, the repeat range is adjusted when there is a high risk of conflict with the repeat playback process by the playback device due to the application recorded on the recording medium, by having the adjustment unit operate when an interval from the time of the event specified by the event specification unit to the end time of one of the playback intervals is equal to or shorter than a predetermined interval.

In a further aspect of the playback device, the adjustment unit adjusts the end time of the repeat range to the time preceding the time of the event specified by the event specification unit by at least an interval required for beginning playback of the digital stream from a start time of the repeat range after the playback unit has played back the digital stream to the end time of the repeat range.

Accordingly, the end time of the repeat range is adjusted to a time that precedes the event time specified by the event specification unit by at least the interval required for repeat playback. Thus, conflict between the repeat playback process and the application executed at the event position specified by the event specification unit is more reliably prevented.

In an alternate aspect of the playback device, the adjustment unit adjusts the end time of the repeat range to the time preceding the time of the event specified by the event specification unit by at least an interval required for pausing playback of the digital stream after the playback unit has played back the digital stream to the end time of the repeat range.

Accordingly, when digital stream playback is restarted from the start position of the repeat range after digital stream playback has been paused, the end time of the repeat range is adjusted to a time that precedes the event time specified by the event specification unit by at least the interval required for resuming digital stream playback. Thus, conflict between the repeat playback process and the application executed at the event position specified by the event specification unit is more reliably prevented.

In another alternate aspect of the playback device, a memory storing a parameter indicating an interval from the time of the event specified by the event specification unit to the end time of the adjusted repeat range.

Accordingly, the repeat range adjustment is performed with reference to a parameter stored in the memory.

In a further alternate aspect of the playback device, the events are each associated with a time in a playback interval of the digital stream, and include mark information indicating a predetermined position in the digital stream and media time events making a notification to the application when a playback timestamp of the digital stream reaches a time associated therewith.

Accordingly, the repeat range adjustment is performed by referencing the mark information and the media time event within the designated repeat range associated with a time closest to the end point of the repeat range.

In yet another aspect of the playback device, an application execution unit executes the application during a playback interval of the digital stream.

Accordingly, the application execution unit is used to execute the application recorded on the recording medium.

In yet a further alternate aspect, the playback device has a device-specific application recorded therein, wherein the playback unit makes a notification of reaching the end time of the repeat range to the device-specific application when a playback time of the digital stream reaches the end time of the adjusted repeat range, upon receiving the notification from the playback unit, the device-specific application makes an instruction to the playback unit to begin playback of the digital stream from the start time of the repeat range, and the playback unit begins playback of the digital stream from the start time of the repeat range in accordance with the instruction from the device-specific application.

Accordingly, repeat playback is performed with the adjusted repeat range in accordance with the device-specific application.

In still another aspect of the playback device, an event verification unit verifying the events within the repeat range input to the repeat range input unit, wherein the event specification unit specifies one of the events verified by the event verification unit as being associated with the time closest to the end time of the repeat range.

Accordingly, an event in the input repeat range is specified as being included in the repeat range and associated with a time closest to the end of the repeat range and thus prone to conflict with the repeat playback process.

In yet another alternate aspect, a playback method performs playback of a digital stream and executes an application, the digital stream and the application being included in a title recorded on a recording medium, wherein the title has a plurality of events set therein for executing the application during the digital stream, and; the playback method comprises: a repeat range input step of receiving input of a repeat range pertaining to the digital stream; an event specification step of specifying one of the events that is within the repeat range input to the repeat range input unit and associated with a time closest to an end time of the repeat range; an adjustment step of creating an adjusted repeat range by adjusting the end time of the repeat range to a time preceding the time of the event specified by the event specification unit; and a playback step of performing repeat playback of the digital stream over the adjusted repeat range.

Accordingly, the playback method provides stable repeat playback, realised without conflict between the application recorded on the recording medium and the repeat playback process by the playback device.

In yet a further aspect, an integrated circuit performs playback of a digital stream and executes an application, the digital stream and the application being included in a title recorded on a recording medium, wherein the title has a plurality of events set therein for executing the application during the digital stream, and; the playback device comprises: a repeat range input unit receiving input of a repeat range pertaining to the digital stream; an event specification unit specifying one of the events that is within the repeat range input to the repeat range input unit and associated with a time closest to an end time of the repeat range; an adjustment unit creating an adjusted repeat range by adjusting the end time of the repeat range to a time preceding the time of the event specified by the event specification unit; and a playback unit performing repeat playback of the digital stream over the adjusted repeat range.

Accordingly, the integrated circuit provides stable repeat playback, realised without conflict between the application recorded on the recording medium and the repeat playback process by the playback device.

In a further alternate aspect, a program causes a computer to perform playback of a digital stream and execution of an application, the digital stream and the application being included in a title recorded on a recording medium, wherein the title has a plurality of events set therein for executing the application during the digital stream, and; the program comprises: a repeat range input step of receiving input of a repeat range pertaining to the digital stream; an event specification step of specifying one of the events that is within the repeat range input to the repeat range input unit and associated with a time closest to an end time of the repeat range; an adjustment step of creating an adjusted repeat range by adjusting the end time of the repeat range to a time preceding the time of the event specified by the event specification unit; and a playback step of performing repeat playback of the digital stream over the adjusted repeat range.

Accordingly, the program provides stable repeat playback, realised without conflict between the application recorded on the recording medium and the repeat playback process by the playback device.

Embodiment 1

The following describes an Embodiment of the present disclosure with reference to the accompanying drawings.

(1. Playback Device Usage Case)

First, a usage case of a playback device pertaining to the present Embodiment is described.

FIG. 1 illustrates a home theatre system that includes the playback device. The system includes a recording medium 100, a playback device 200, a control device 300, and a display device 400. The configuration of each device is described below.

(1.1 Recording Medium 100)

The recording medium 100 is an optical disc such as a BD-ROM (Blu-ray Disc Read-Only Memory), a semiconductor memory card such as an SD card (Secure Digital memory card), or a hard disk drive, and serves to supply the home theatre system with films, for example.

An application is also recorded on the recording medium 100, for execution along with a digital stream during a playback interval thereof. Playback control, such as drawing graphics in connection with digital stream data, is performed by executing the application.

(1.2 Playback Device 200)

The playback device 200 is a BD player, a DVD player, or similar, and reads video from the recording medium 100. The playback device 200 is connected to the display device 400 via an HDMI (High-Definition Multimedia Interface) cable or similar, and transmits the read video to the display device 400.

(1.3 Control Device 300)

The control device 300 is a remote control or similar control apparatus, receiving controls from a user through a hierarchical GUI (Graphical User Interface) displayed on the display device 400. In order to receive user operations, the control device 300 has a menu key for calling a menu, a set of arrow keys for shifting the focus on GUI elements making up the menu, an enter key for making a selection operation of one of the GUI elements, a back key for returning to a higher-level portion of the hierarchical menu, number keys, and so on.

(1.4 Display Device 400)

The display device 400 displays the video played back by the playback device 200 on a display screen. The display device 200 also supplies an interactive control environment to the user by displaying the menu and the like on the display screen.

This concludes the description of the usage case of the playback device pertaining to the present Embodiment. Next, the internal configuration of the recording medium is described.

(2. Recording Medium Configuration)

Figure 2:
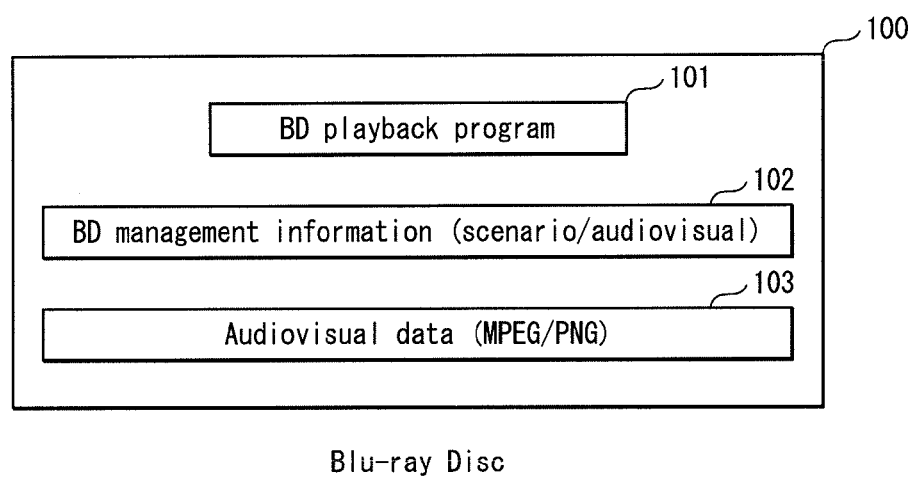
FIG. 2 indicates the configuration of a BD-ROM.

FIG. 2 illustrates the configuration of a BD-ROM (hereinafter also termed BD). Although the following describes the recording medium 100 as a BD-ROM, no such limitation is intended. The recording medium 100 may be any recording medium on which the digital stream and the application executed during a playback interval of the digital stream are both recorded.

As shown in FIG. 2, the recording medium 100 includes audiovisual data 103, BD management information 102 such as management information pertaining to the audiovisual data and to an audiovisual playback sequence, and a BD playback program 101 (also termed BD-1 application) realising various playback operations, such as interactive graphics display.

Figure 3:
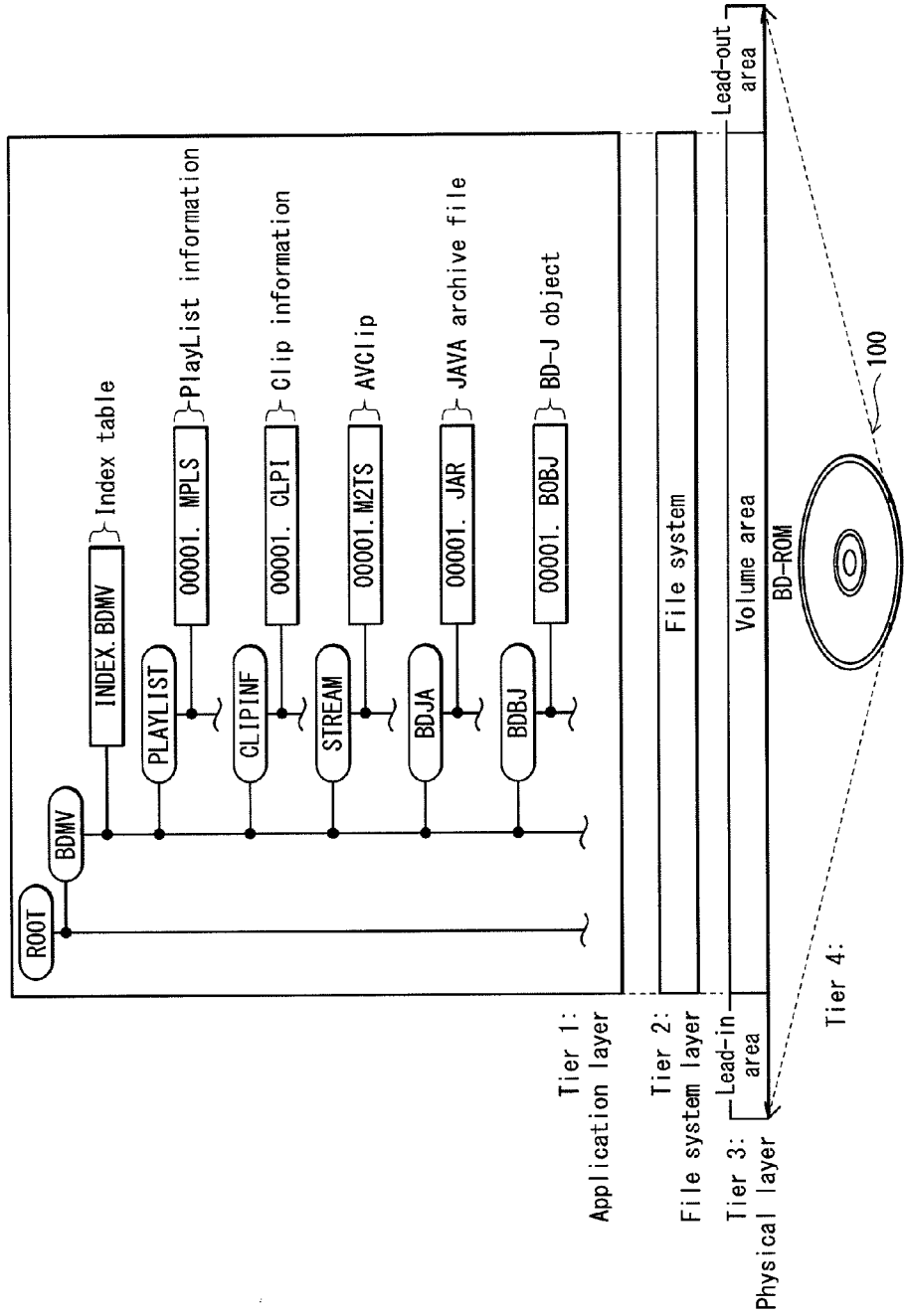
FIG. 3 illustrates logical data recorded on a recording medium 100.

FIG. 3 illustrates logical data recorded on the recording medium 100.

The recording medium 100 has a spiralling recording area extending outwardly from an inner circumference to an outer circumference of the disc. A logical address space is located between a lead-in at the inner circumference and a lead-out at the outer circumference. Also, a BCA (Burst Cutting Area) is provided as a special area within the lead-in. The information in this area is unreadable by a (non-diagrammed) drive device installed within the recording medium, and by the application. Thus, the area is used for copyright protection information and the like.

Video data and the like are recorded in the logical address space, beginning with file system (volume) information. The file system is, for example, UDF or ISO 9660, and makes the logical data readable through a file and directory structure similar to that of a typical PC.

Five subdirectories are located within a BDMV directory, namely a PLAYLIST directory, a CLIPINF directory, a STREAM directory, a BDJA directory and a BDBJ directory. The BDMV directory contains a file named INDEX.BDMV that is an example of the BD management information 102.

The STREAM directory contains a file including data corresponding to a digital stream that corresponds to the audiovisual data 103, the file having the extension M2TS (e.g., 00001.M2TS in FIG. 3).

The PLAYLIST directory contains a file having the extension MPLS (e.g., 00001.MPLS in FIG. 3).

The CLIPINF directory contains a file having the extension CLPI (e.g., 00001.CLPI in FIG. 3).

The BDJA directory contains a file having the extension JAR (e.g., 00001.JAR in FIG. 3). This file (00001.JAR) is a Java application, for example. The Java application is an example of the BD playback program 101.

The BDBJ directory contains a file having the extension BOBJ (e.g., 00001.BOBJ in FIG. 3).

The following describes the aforementioned files.

A file having the extension M2TS (e.g., 00001.M2TS) stores, for example, an AVClip file. An AVClip file is made up of a video stream made up of a plurality of video frames and an audio stream made up of a plurality of audio frames, respectively converted into PES packets and multiplexed.

A file having the extension CLPI (e.g., 00001.CLPI) is a clip information file, and is provided in one-to-one correspondence with the AVClip file. To serve as management information, the clip information file includes management information such as the stream encoding format, framerate, bitrate, resolution, and the like for the AVClip file, as well as an EP_map indicating a leading position of the GOP.

A file having the extension MPLS (e.g., 00001.MPLS) is a playlist file including information that defines a playlist referencing the AVClip file.

Figure 4:
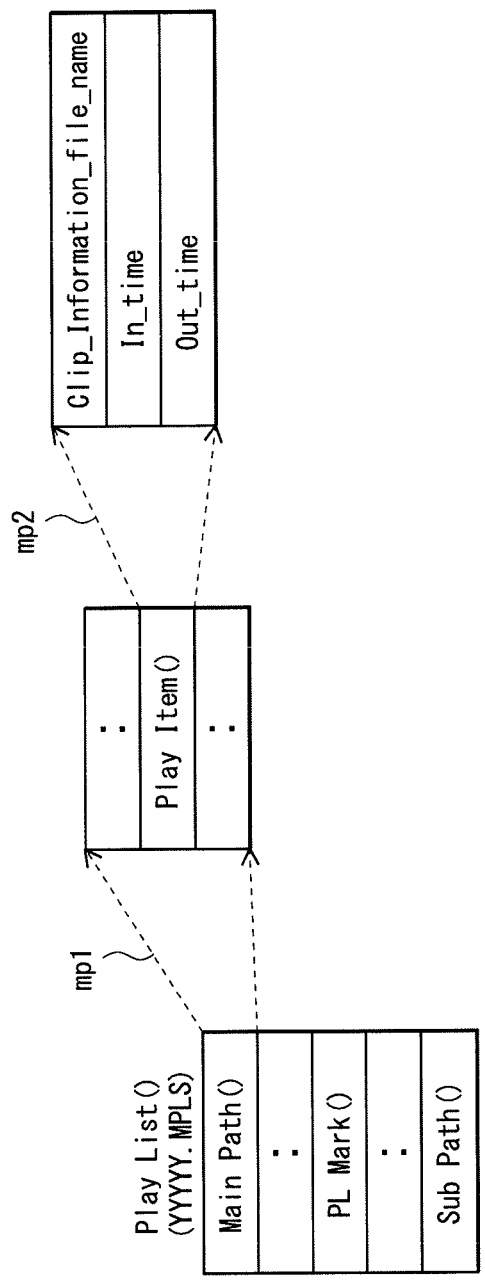
FIG. 4 indicates an example of information included in a playlist file.

FIG. 4 illustrates an example of information included in a playlist file. The playlist file includes, for example, MainPath information and PLMark information.

The MainPath information (MainPath( )) is made up of a plurality of pieces of PlayItem information (PlayItem( )) as indicated by dashed arrow mp1 in FIG. 4. The PlayItem information is a playback interval defined by designating an In_Time and an Out_Time with respect to a playback time axis of one or more AVClip files. A playlist (hereinafter also abbreviated PL) made up of a plurality of playback intervals is defined by arranging a plurality of pieces of PlayItem information. Dashed arrow mp2 of FIG. 4 indicates a close-up of the internal configuration of a piece of PlayItem information. As shown, a piece of PlayItem information includes a Clip_information_file_name field indicating the corresponding AVClip file, an In_time field, and an Out_time field.

Figure 5:
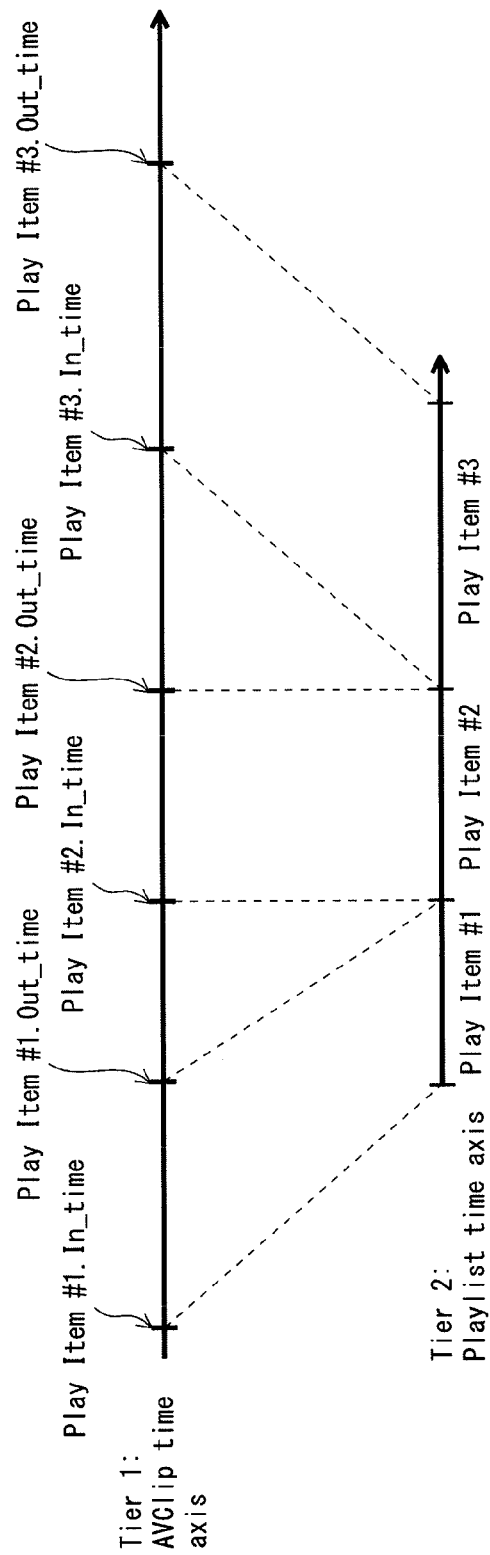
FIG. 5 illustrates the relationship between an AVClip file and a playlist.

FIG. 5 illustrates the relationship between the AVClip file and the PL.

The first tier indicates the time axis of the AVCLip file, while the second tier indicates the time axis of the playlist. The playlist file includes PlayItem information, for example PlayItems #1, #2, and #3. The In_time and Out_time of each of the PlayItems #1, #2, and #3 define three playback intervals.

Figure 6:
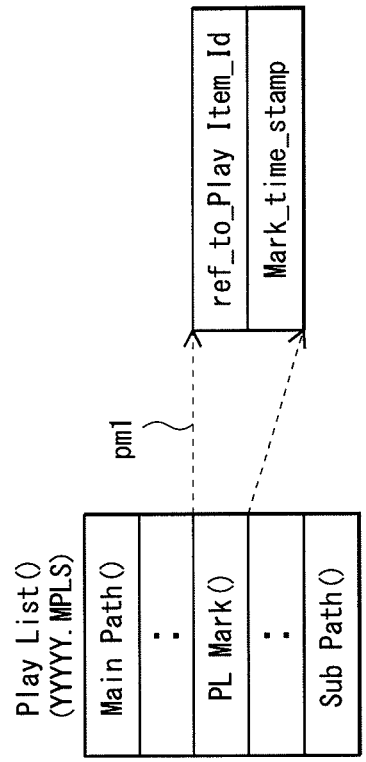
FIG. 6 illustrates an example of PLmark information configuration.
Figure 7:
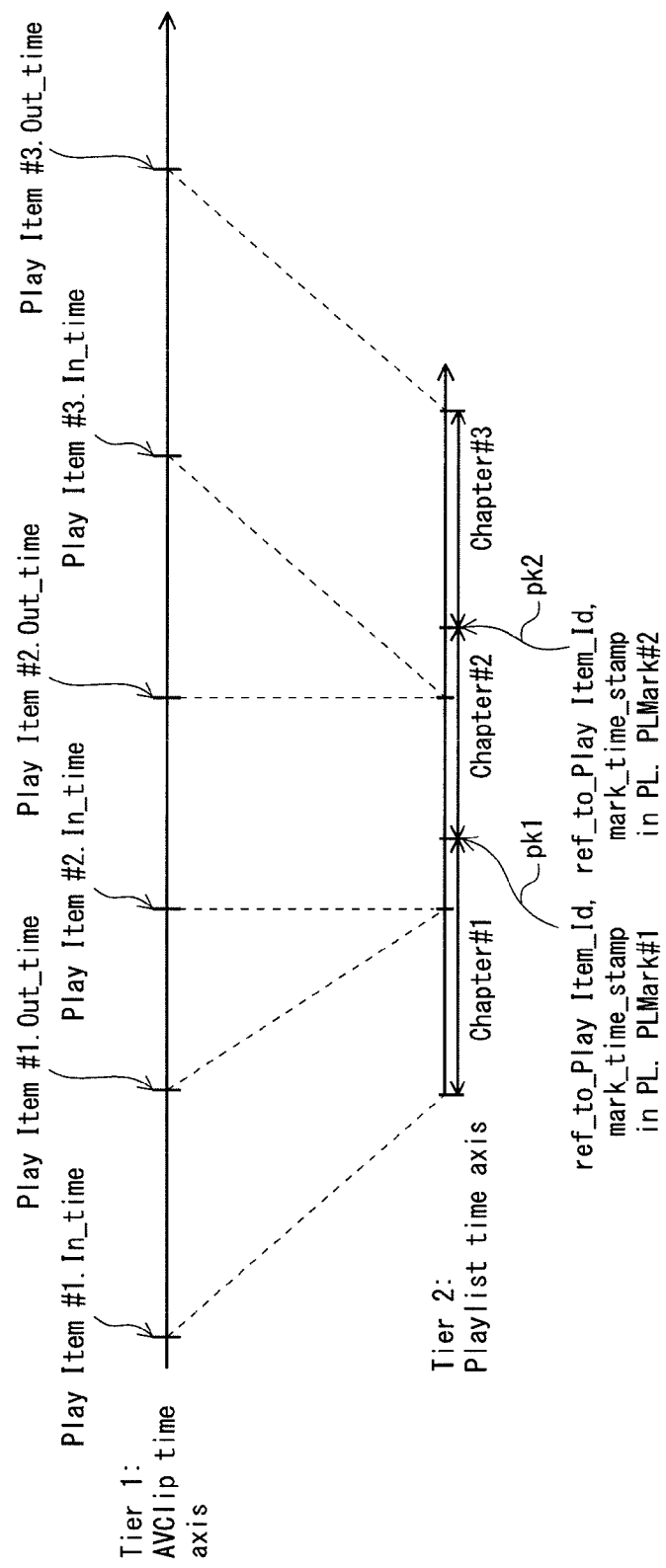
FIG. 7 illustrates an example of chapter definitions included in the PLmark information.

The PLmark information (PLmark( )) designates a given interval along the time axis of the PL as a chapter. FIG. 6 illustrates an example of PLmark information. As indicated by dashed arrow pm1, the PLmark information includes a ref to_PlayItem_Id field and a Mark_time_stamp field. FIG. 7 illustrates an example of chapter definitions included in the PLmark information.

The first tier indicates the time axis of the AVCLip file, while the second tier indicates the time axis of the playlist.

In FIG. 7, arrows pk1 and pk2 each indicate a PlayItem designation (ref_to_PlayItem_Id) and a timestamp (mark_time_stamp) at the PLmark. These indications define three chapters (chapters #1, #2, and #3) with respect to the time axis of the playlist. This concludes the description of the PLmark information.

A file having the extension BOBJ contains a Java object (termed a BD-J object). A BD-J object includes, for example, information pertaining to a playlist that is to be played back when an associated title is selected, and information pertaining to an application that is executable in connection with the associated title. The BD-J object may also, for example, include information pertaining to a playlist designated by an application other than the playlist to be played upon title selection.

The INDEX.BDMV file is management information pertaining to the BD-ROM as a whole, and includes information such as an identifier specifying the provider of the film product, identifiers allocated to each BD-ROM provided by the provider, and so on. Once the BD-ROM is loaded into the playback device 200, the INDEX.BDMV is first read so that the playback device 200 is able to uniquely acknowledge the BD-ROM.

The INDEX.BDMV file includes a table indicating a plurality of titles playable by the BD-ROM in association with objects defining each of the titles.

The following describes the types of titles that may be recorded on the BD-ROM. The titles that may be recorded on the BD-ROM include not only AVCLip files played back using a playlist, but also application-executable titles (i.e., Java titles and BD-J titles) and movie titles for which playback is enabled by the AVCLip file that uses a playlist.

Figure 8:
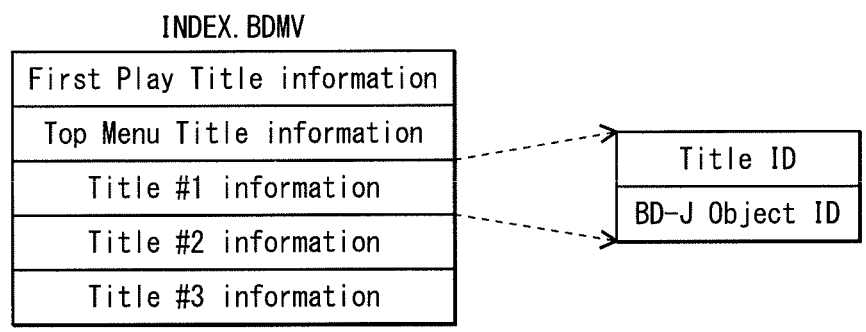
FIG. 8 illustrates an example of INDEX.BDMV file configuration.

FIG. 8 illustrates an example of INDEX.BDMV file configuration. The example of FIG. 8 shows that the INDEX.BDMV file is made up of title information, namely FirstPlayTitle information, Top_menuTitle information, Title#1 information, Title#2 information, and Title#3 information. In the example of FIG. 8, the Title#1 information indicates information that includes the title ID and the BD-J object information defining the title, for instance.

The FirstPlayTitle information is a title having the role of being the first dynamic scenario to be played back, before anything else, when the BD-ROM is loaded. The FirstPlayTitle information realises the common practice of playing back a dynamic scenario that represents the creators and distributors of a film upon loading.

The Top_menuTitle information is a title (i.e., a Java title or a BD-J title) able to execute playback of the top level menu within the BD-ROM menu hierarchy, of the AVCLip file, and of the application.

The Title#1 information, Title#2 information, and Title#3 information are ordinary film titles.

A movie object other than the aforementioned BD-J object is also associated with each title. Correspondingly, the title associated with the movie object is termed a movie title (i.e., a title available for playback similar to conventional DVD playback).

Specific explanations of the movie object and movie title are omitted due to lack of direct relevance to the present Embodiment.

The INDEX.BDMV is notable in indicating the correspondence between each object and the FirstPlayTitle information, the Top_menuTitle information, the Title#1 information, the Title#2 information, and the Title#3 information.

Although not diagrammed, files other than the files listed above are also recorded as part of the audiovisual data 103, namely PNG format (an image format standardised by the W3C) files (e.g., ZZZ.PNG, where ZZZ is variable and the PNG extension is fixed) representing subtitles or the like (hereinafter termed PNG data). Each set of PNG data represents one file.

The file and directory configuration explained with reference to FIG. 3 is intended only as an example. The present Embodiment is also realisable with alternative configurations.

This concludes the description of the recording medium 100 configuration pertaining to the present Embodiment. Next, the details of the playback device 200 are described.

(3. Playback Device 200)

(3.1 Playback Device 200 Internal Configuration)

Figure 9:
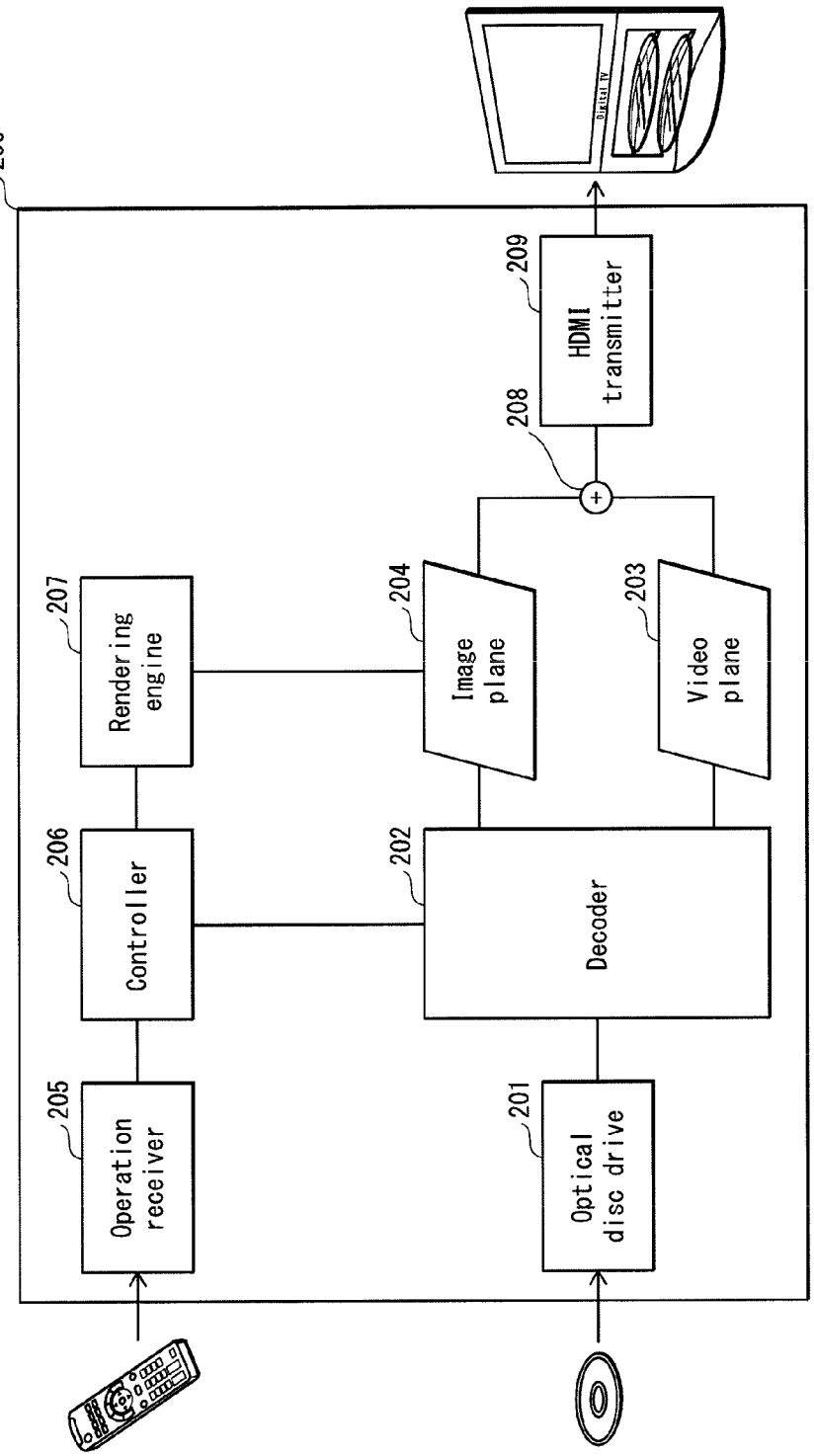
FIG. 9 illustrates an example of the internal configuration of a playback device 200.

FIG. 9 illustrates an example of the internal configuration of the playback device 200. Although the following describes the playback device 200 as a BD player, no such limitation is intended. The playback device 200 may be any playback device able to play back a digital stream and execute an application from a recording medium on which a file that includes the digital stream and the application are recorded.

As shown in FIG. 9, the playback device 200 includes an optical disc drive 201, a decoder 202, a video plane 203, an image plane 204, an operation receiver 205, a controller 206, a rendering engine 207, an adder 208, and an HDMI transmitter 209. The configuration of each component is described below.

(3.1.1 Optical Disc Drive 201)

The optical disc drive 201 performs loading, reading, and ejection of the recording medium 100, thus realising access to the recording medium 100.

(3.1.2 Decoder 202)

The decoder 202 acquires video frames from a digital stream read by the optical disc drive 201, and obtains uncompressed pictures by decoding the video stream so acquired.

(3.1.3 Video Plane 203)

The video plane 203 is a memory for storing the uncompressed pictures output by the decoder 202.

(3.1.4 Image Plane 204)

The image plane 204 is a memory having an area for storing one screen of image data. In the present Embodiment, the one screen of image data is uncompressed graphics data, for example. The uncompressed graphics, such as PNG data and image files, rendered by the later-described rendering engine 207 are arranged on the image plane 204.

(3.1.5 Operation Receiver 205)

The operation receiver 205 includes an infra-red reception element or the like, and receives operation input signals from the user using a remote or similar. In the present Embodiment, the operation receiver 205 receives input of a repeat range from the user.

(3.1.6 Controller 206)

The controller 206 is an IC (integrated circuit) having a CPU (Central Processing Unit) and non-volatile memory, performing repeat range adjustment processing, repeat playback processing, application execution processing, and other types of playback control processing. The specifics of the functional configuration of the controller 106 are described later.

(3.1.7 Rendering Engine 207)

The rendering engine 207 has base software such as Java2D or OPEN-GL and renders computer graphics in accordance with instructions from the controller 206. The computer graphics so rendered are then output to the image plane 204.

(3.1.8 Adder 208)

The adder 208 combines and outputs the graphics on the image plane 204 with the uncompressed picture data stored in the video plane 203.

(3.1.9 Transmitter 209)

When connected to another device in the home theatre system, such as the display device 400, via an interface, the transmitter 209 passes through a negotiation phase and enters a data transfer phase in which to perform data transmission and reception. The negotiation phase is a phase of acknowledging the capabilities of the other device (including decoding capability, playback capability, and display frequency capability), setting the player settings registers, and determining a transfer method for subsequent transfers, and also includes a mutual authentication phase of the connected devices each verifying the validity of the other.

After the negotiation phase, the transmitter 209 transfers the uncompressed picture data to the display device 400 in accordance with a horizontal synchronization period thereof. Also, the transmitter 209 transfers uncompressed plain-text audio data to the display device 400 in accordance with the horizontal and vertical sweep periods thereof.

This concludes the description of the configuration of the playback device pertaining to the present Embodiment. The functional configuration of the controller 206 is explained next.

(3.2 Controller 206 Functional Configuration)

Figure 10:
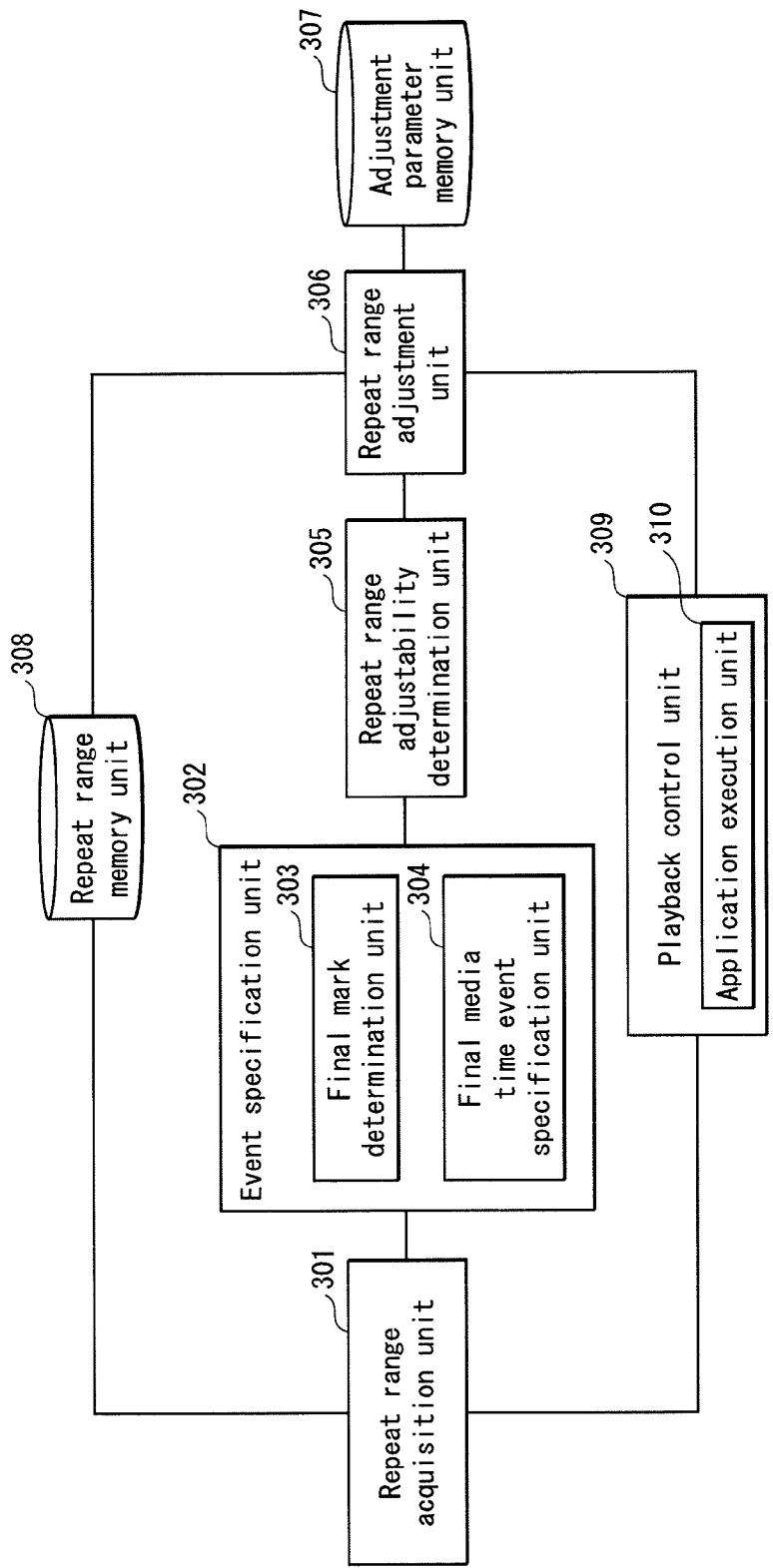
FIG. 10 illustrates the functional configuration of a controller 206.

FIG. 10 illustrates the functional configuration of the controller 206. As shown, the controller 206 includes a repeat range acquisition unit 301, an event specification unit 302, a repeat range adjustability determination unit 305, a repeat range adjustment unit 306, an adjustment parameter memory unit 307, a repeat range memory unit 308, and a playback control unit 309. The event specification unit 302 includes a final mark determination unit 303 and a final media time event specification unit 304. Also, the playback control unit 309 includes an application execution unit 310.

The processing by the repeat range acquisition unit 301, the event specification unit 302, the final mark determination unit 303, the final media time event specification unit 304, the repeat range adjustability determination unit 305, the repeat range adjustment unit 306, the playback control unit 309, and the application execution unit 310 is performed by having the CPU execute program code stored in the non-volatile memory. Also, the adjustment parameter memory unit 307 and the repeat range memory unit 308 are portions of the non-volatile memory. The functional configuration of each component is described below.

(3.2.1 Repeat Range Acquisition Unit 301)

The repeat range acquisition unit 301 acquires a repeat range designated by the user or similar. Specifically, the repeat range acquisition unit 301 displays an OSD (On-Screen Display) menu. The user inputs a repeat range in accordance with the OSD menu, using the remote control or similar. The repeat range acquisition unit 301 then acquires the repeat range from the operation input signals received by the operation receiver 205.

Figure 11:
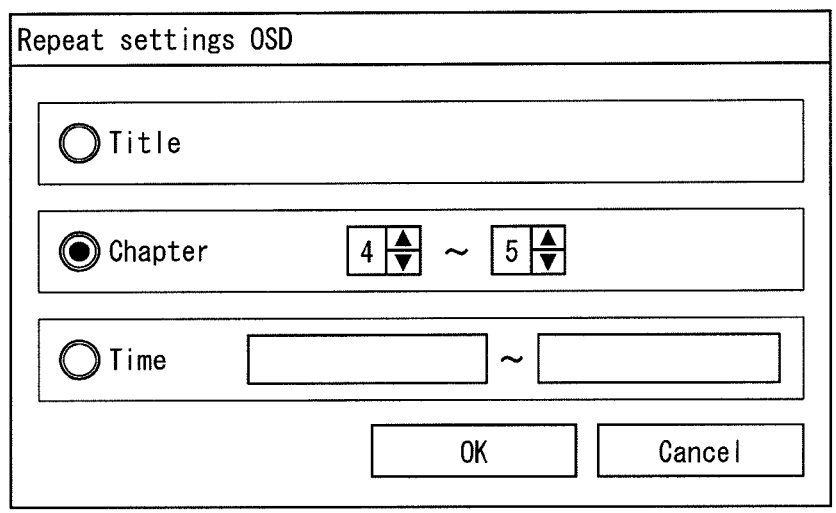
FIG. 11 illustrates an example of an OSD menu.

FIG. 11 illustrates an example of the OSD menu. The OSD menu displays repeat modes such as title repeat, chapter repeat, or special range repeat, as well as a repeat range (i.e., a repeat start position and a repeat end position). In the example shown, the repeat range is shown as being from chapter 4 to chapter 5.

Here, the repeat range acquisition unit 301 references the playlist information of a playback target that is included in the BD-J object corresponding to the selected title, and specifies the repeat start position and the repeat end position. The playlist information pertains to a BD-J object-playable playlist.

FIG. 12 lists examples of representative data within the information included in the playlist, for ease of explanation pertaining to the present Embodiment.

Specifically, the titleStartMT field indicates the playback start position (In_Time) of the AVCLip file played back first within a playback target playlist among the playlists included in the BD-J object associated with the title. Also, the titleEndMT field indicates the playback end position (Out_Time) of the AVCLip played back last within the aforementioned playlist. The playback end position corresponds to the position at which title playback ends. Next, the mk_num field indicates the total number of marks in the aforementioned playlist. The fields mk[0] through mk[5] each indicate a PTS (Presentation Time-Stamp) associated with the corresponding mark. Also, the chp_num field indicates the total number of chapters within the aforementioned playlist. The fields chp[0] through chp[4] each indicate a PTS associated with the start position of the corresponding chapter.

For example, when the repeat mode is title repeat, the repeat range acquisition unit 301 references the titleStartMT and titleEndMT fields included in the playlist to specify the repeat start position and the repeat end position. Also, when the repeat mode is chapter repeat, the repeat range acquisition unit 301 references the chp[0] through chp[4] fields to specify the repeat start position and the repeat end position. Likewise, when the repeat mode is time, the repeat range acquisition unit 301 references the times input by the user via the OSD menu (i.e., times with respect to the digital stream) and converts the times into PTS to specify the repeat start position and the repeat end position.

(3.2.2 Event Specification Unit 302)

The event specification unit 302 includes the final mark determination unit 303 and the final media time event specification unit 304. The event specification unit 302 specifies an event (a final event) that is within the repeat range acquired by the repeat range acquisition unit 301 and is associated with the timestamp closest to the end time of the repeat range.

The title has a plurality of events for executing the Java application (hereinafter also termed the BD-J application) recorded on the BD, while playing back the digital stream using the playlist. As such, the event includes mark information and media time events. The later-described application execution unit 310 executes the BD-J application using the event as a trigger. Accordingly, the BD-J application is executed at the desired playback position of the digital stream.

The event specification unit 302 specifies, as the final event, an event associated with whichever of the final mark specified by the later-described final mark determination unit 303 and the final media time event specified by the later-described final media time event specification unit 304 is closer to the end time of the repeat range. Accordingly, an event having a high risk of interfering with the repeat playback process is specifiable.

(3.2.3 Final Mark Determination Unit 303)

The final mark determination unit 303 specifies a piece of mark information (a final mark) that is within the repeat range acquired by the repeat range acquisition unit 301 and is associated with the timestamp closest to the end time of the repeat range. Specifically, the final mark determination unit 303 references the playlist information shown in FIG. 12 to specify the final mark. The mark information indicates a predetermined position in the digital stream, and is useable as information specifying a cue position and indicating an execution position for the BD-J application.

(3.2.4 Final Media Time Event Specification Unit 304)

The final media time event specification unit 304 specifies a media time event (a final media time event) that is within the repeat range acquired by the repeat range acquisition unit 301 and is associated with the timestamp closest to the end time of the repeat range.

The media time event is associated with a timestamp in the playback interval of the digital stream, and makes notifications to the BD-J application and the like when the timestamp associated with the playback time of the digital stream is reached.

FIG. 13 indicates the content of a media time event settings table. The mt_num field indicates the total number of media time events in the title. Fields mt[0] through mt[2999] each indicate a PTS associated with one of the media time events. The final media time event specification unit 304 references the media time event settings table indicated in FIG. 13 to specify the final media time event.

(3.2.5 Repeat Range Adjustability Determination Unit 305)

The repeat range adjustability determination unit 305 references the end event specified by the event specification unit 302 and determines whether or not the repeat range is adjustable. Specifically, the repeat range adjustability determination unit 305 determines whether or not an interval from the time of the final event to the end of the playback interval for the playlist or chapter is equal to or shorter than a predetermined interval. When the determination is affirmative, the repeat range adjustability determination unit 305 determines that the repeat range is to be adjusted due to a high probability of the BD-J application using the final mark position for a control process pertaining to the playback quality, such as black-screen display or a change in resolution. When the determination is negative, the repeat range adjustability determination unit 305 determines that the repeat range is not to be adjusted. Accordingly, the repeat range is adjusted when there is a high risk of conflict with the repeat playback process by the playback device due to the application recorded on the recording medium.

(3.2.6 Repeat Range Adjustment Unit 306)

The repeat range adjustment unit 306 adjusts the repeat range acquired by the repeat range acquisition unit 301. Specifically, the repeat range adjustment unit 306 adjusts the end time of the repeat range so as to precede the time of the final event specified by the event specification unit 302 by the predetermined interval. Then, the repeat range adjustment unit 306 stores the adjusted repeat range in the repeat range memory unit 308.

(3.2.7 Adjustment Parameter Memory Unit 307)

The adjustment parameter memory unit 307 stores a threshold lastLength for the interval from the final event to the end time of the playback interval, used in the adjustability determination for the repeat range, and an adjustment parameter adjMT for the end time of the repeat range, used in the repeat range adjustment.

FIG. 14 illustrates the content of the adjustment parameter stored in the adjustment parameter memory unit 307. In the example, the lastLength field reads 45000 and the adjMT field reads 1875 (both referring to a PTS).

The threshold lastLength for the interval from the time of the final event to the end time of the playback interval may be a PTS corresponding to one second, for example.

Also, the adjustment parameter adjMT for the end time of the repeat range may be a PTS corresponding to a single frame.

Also, the threshold lastLength may be equal to or greater than the interval needed to begin digital stream playback after the start time of the repeat range, once the playback control unit 309 has played back the digital stream and the end time of the repeat range is reached. The end time of the repeat range is adjusted to a time that precedes the event time specified by the event specification unit 302 by at least the interval required for repeat playback. Thus, conflict between the repeat playback process and the application executed at the event position specified by the event specification unit 302 is more reliably prevented.

Also, the threshold lastLength may be equal to or greater than the interval needed to pause digital stream playback, once the playback control unit 309 has played back the digital stream and the end time of the repeat range is reached. When digital stream playback is restarted from the start position of the repeat range after digital stream playback has been paused, the end time of the repeat range is adjusted to a time that precedes the event time specified by the event specification unit 302 by at least the interval required for resuming digital stream playback. Thus, conflict between the repeat playback process and the application executed at the event position specified by the event specification unit 302 is more reliably prevented.

(3.2.8 Repeat Range Memory Unit 308)

The repeat range memory unit 308 stores the repeat start position and the repeat end position. Specifically, the repeat start position and the repeat end position are those acquired by the repeat range acquisition unit 301. Also, the repeat range memory unit 308 stores the repeat start position and the repeat end position as adjusted by the repeat range adjustment unit 306.

FIG. 15 indicates the content of a repeat range table stored in the repeat range memory unit 308. The startMT field indicates the repeat start position. Likewise, the endMT field indicates the repeat end position.

(3.2.9 Playback Control Unit 309 and Application Execution Unit 310)

The playback control unit 309 includes the application execution unit 310, and executes functions such as audiovisual playback and playlist playback according to a function call from a resident application unique to the playback device and from the BD-J application. The audiovisual playback functions are a group of functions inherited from DVD and CD players, including playback start, playback stop, pause, pause release, freeze-frame release, fast-forward at an immediately-specified speed, rewind at an immediately-specified speed, audio change, sub-video change, angle change, and repeat playback.

The playlist playback functions are playback start and playback stop as performed according to the playlist information. In particular, the playback control unit 309 pertaining to the present Embodiment performs repeat playback according a request from the resident application.

The repeat playback by the resident application occasionally conflicts with processes by the BD-J application. The conflict between the repeat playback process and the BD-J application is described later.

This concludes the description of the configuration of the controller 206 pertaining to the present Embodiment. The following describes the adjustment by the repeat range.

(4. Repeat Range Adjustment)

(4.1 Conventional Playback Device Problem)

First, a problem that occurs in a conventional playback device is described.

The BD-ROM is able to execute various forms of playback, such as displaying interactive graphics, by executing the BD-J application.

Figure 16:
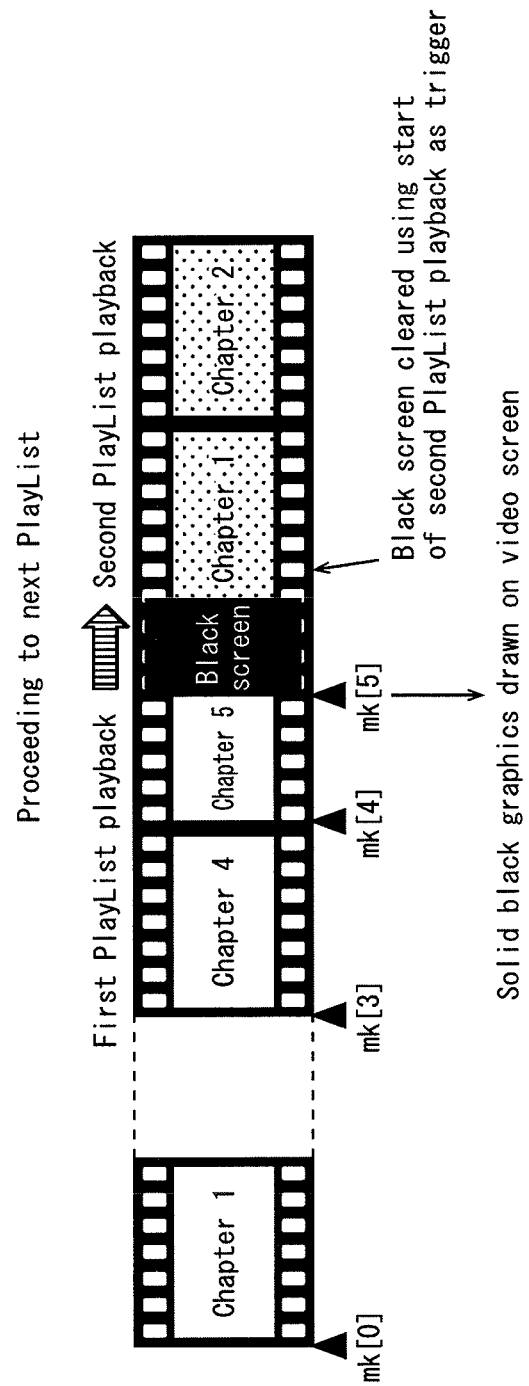
FIG. 16 illustrates black-screen display by a BD-J application.

FIG. 16 illustrates black-screen display by the BD-J application. In the example shown, the BD-J application combines the video screen with a black screen by instructing the playback control unit to draw solid black graphics, using mark information mk[5], which is the mark information in the title associated with a position closest to the end of the first playlist, as a trigger. Then, the BD-J application clears the black screen by instructing the playback control unit to perform a black screen clearing, using the playback start of the second playlist as a trigger. When proceeding to a subsequent playlist, blacking out the screen prevents distortions of the video screen that occur at playlist transit time.

As a result of innovative research, the inventor discovered that when the BD-J application is executed during the repeat playback interval, a conflict occasionally occurs between the repeat playback process and the BD-J application process.

Figure 17:
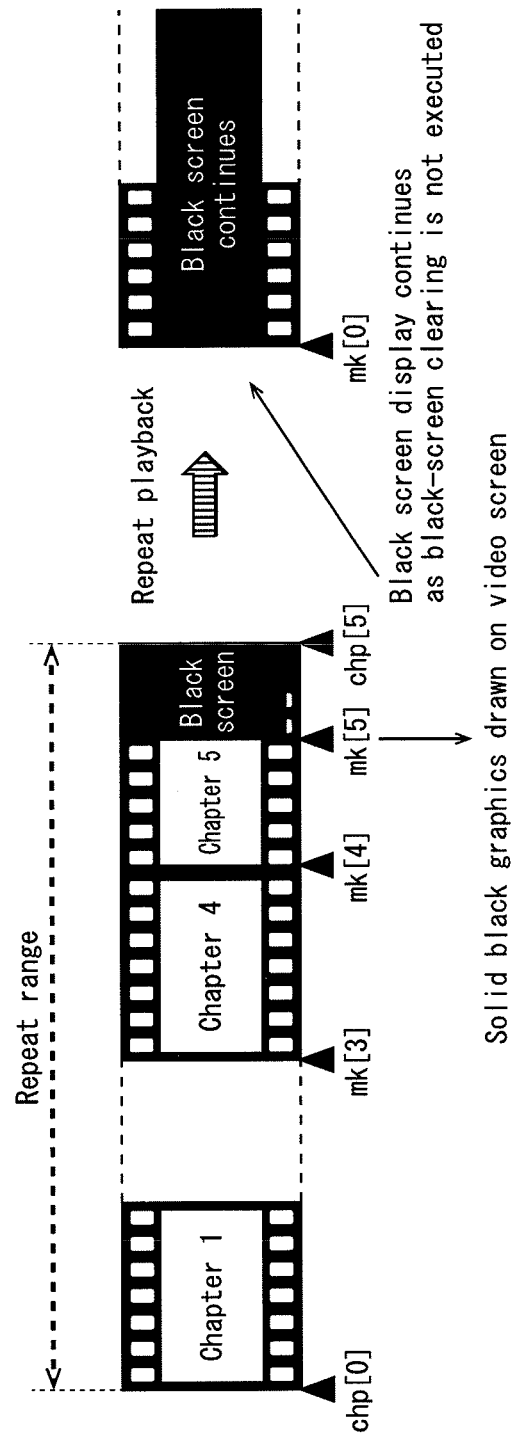
FIG. 17 illustrates a conflict between the repeat playback process and the black-screen display by the BD-J application.

FIG. 17 illustrates a conflict between the repeat playback process and a black-screen display by the BD-J application. In the example shown, repeat playback is performed from chapter 1 to chapter 5. In this situation, the playback device notifies the BD-J application of a mark passing event upon reaching the playback position in the mark information mk[5]. The BD-J application then combines the video screen with a black screen by making an instruction to the playback control unit to draw solid black graphics. Then, upon reaching the end of chapter 5 (chp[5]), which is the repeat end position, playback of the beginning of chapter 1 (chp[0]), which is the repeat start position, begins. Black-screen clearing is configured occur using the playback start of the second playlist as a trigger. As such, when repeat playback is performed within the first playlist, the black-screen clearing is not performed as the playback of the second playlist does not begin. Thus, the black-screen display continues. As a result, the user is unable to correctly view the content subject to repeat playback.

Figure 18:
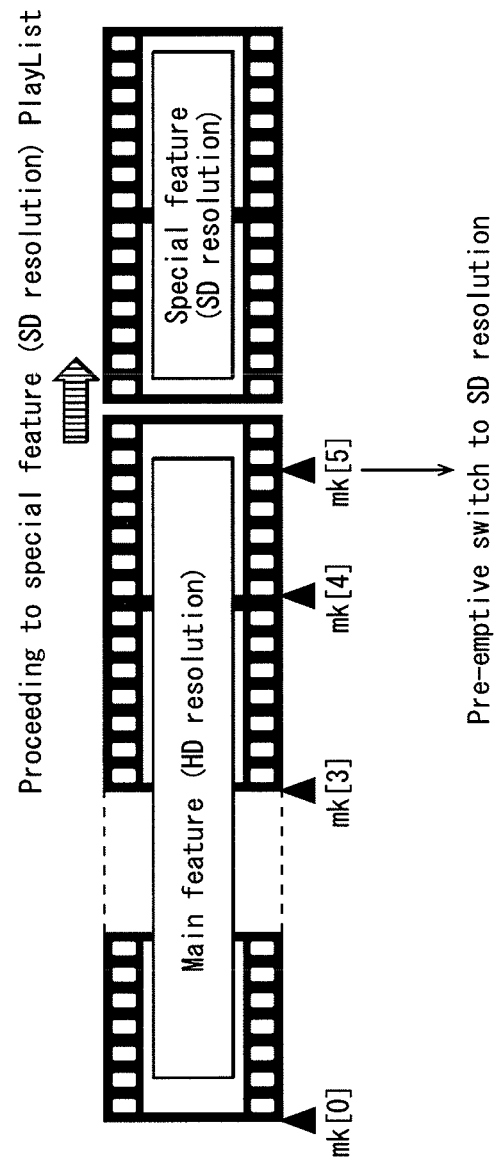
FIG. 18 illustrates a change in resolution by the BD-J application.

Another example involves a change in resolution performed by the BD-J application. FIG. 18 illustrates the change in resolution by the BD-J application. In the example shown, special feature content is configured to play at a standard definition (hereinafter, SD) resolution after main content plays at a high definition (hereinafter, HD) resolution.

The resolution is changed when switching to the special feature content after the conclusion of the main content. As such, a blank period occurs after the main content, during which the special feature content cannot be played back. Thus, the BD-J application instructs the playback control unit to switch from the HD resolution to the SD resolution, using mark information mk[5], which is the mark information associated with a position closest to the end of the main content playlist, as a trigger. Accordingly, no blank period occurs after the conclusion of the main content at the HD resolution, and the special feature content is played back at the SD resolution.

However, a conflict occurs between the repeat playback process and the BD-J application when the BD-J application is executed during the repeat playback interval.

Figure 19:
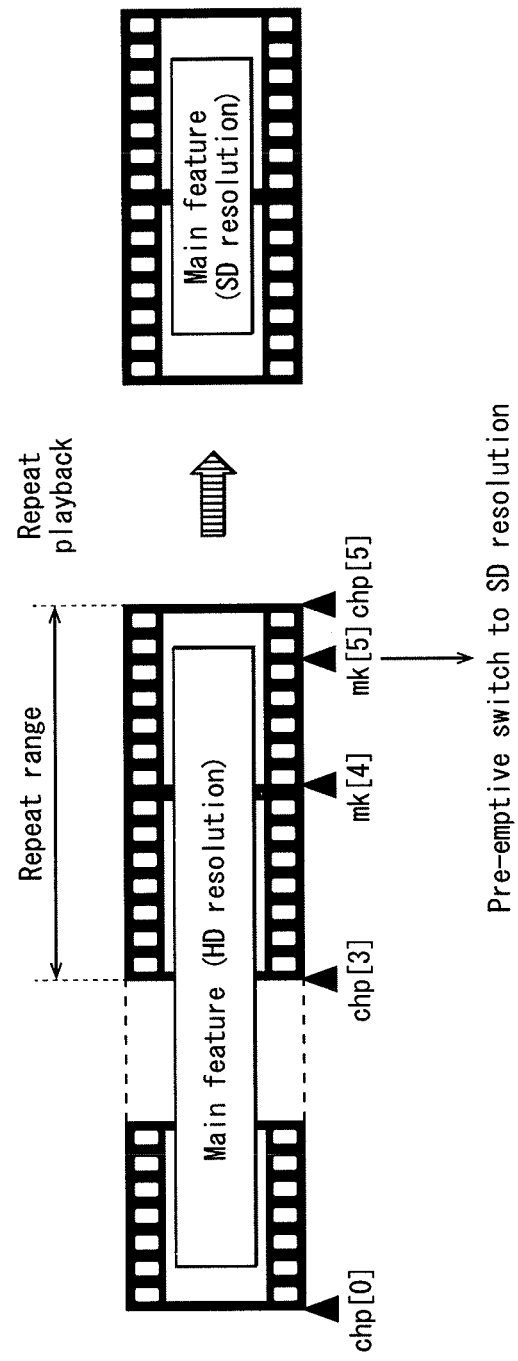
FIG. 19 illustrates a conflict between the repeat playback process and the change in resolution by the BD-J application.

FIG. 19 illustrates a conflict between the repeat playback process and a change in resolution by the BD-J application. In the example shown, repeat playback is performed from chapter 3 to chapter 5. In this situation, the playback device notifies the BD-J application of a mark passing event upon reaching the playback position in the mark information mk[5]. The BD-J application instructs the playback control unit to switch to the SD resolution. Then, upon reaching the end of chapter 5 (chp[5]), which is the repeat end position, the playback control unit begins playback from the beginning of chapter 3 (chp[2]), which is the repeat start position. As a result, the repeat playback from chapter 3 occurs at the SD resolution, and the user is unable to enjoy the content subject to the repeat playback at the HD resolution.

Figure 20:
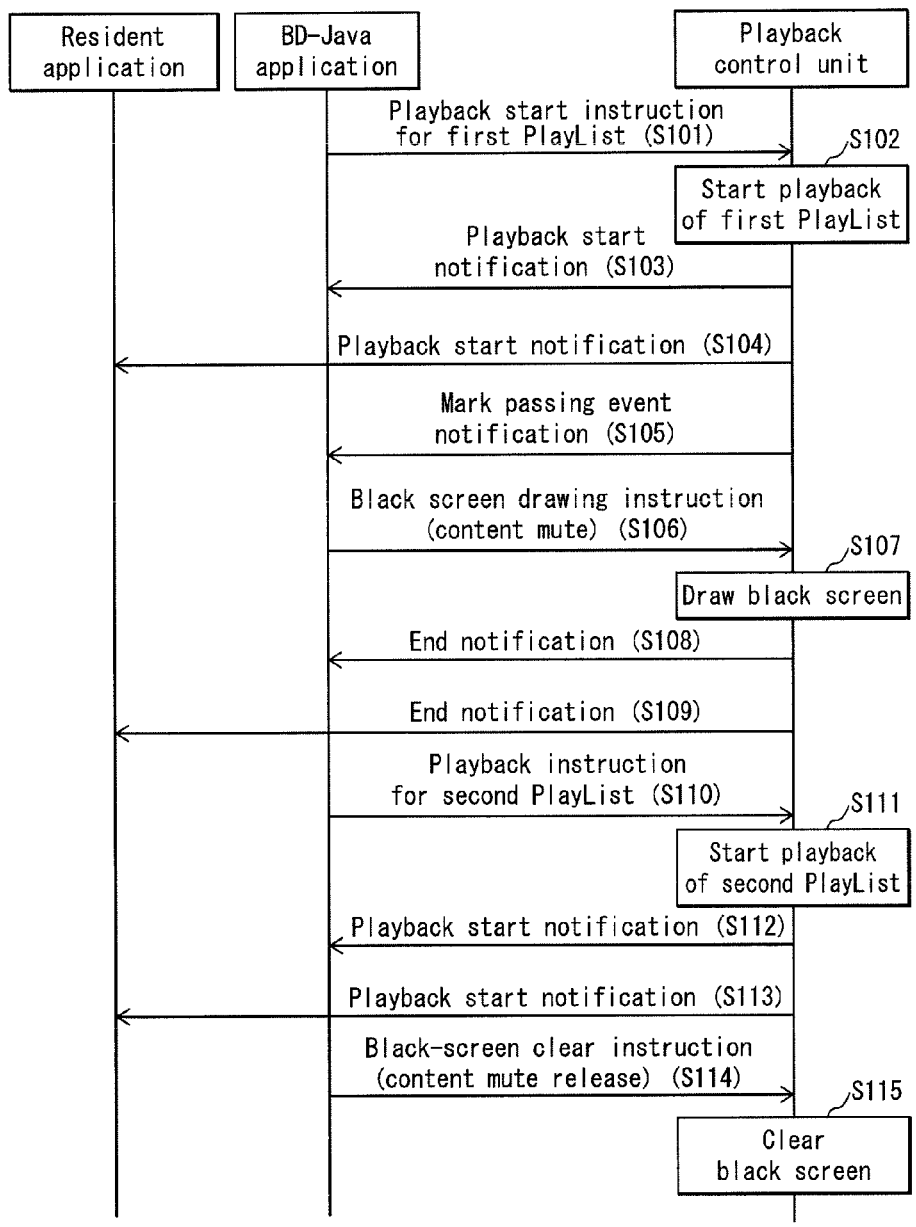
FIG. 20 is a sequence diagram indicating an operations flow by a resident application, the BD-J application, and the playback control unit when performing the black-screen display from FIG. 16.

FIG. 20 is a sequence diagram indicating the operations flow performed by the resident application, the BD-J application, and the playback control unit when performing the black-screen display from FIG. 16.

As shown, the BD-J application makes a playback start instruction to the playback control unit 309 for the first playlist (step S101).

The playback control unit 309 receives the playback start instruction from the BD-J application and begins playback of the first playlist (step S102).

Step S101 is not needed when the first playlist is configured for automatic playback according to a (non-diagrammed) flag for automatic playback upon title selection. In such situations, step S102 involves beginning playback of the first playlist without receiving the playback start instruction from the BD-J application.

After beginning the playback of the first playlist, the playback control unit 309 makes a playback start notification to the BD-J application (step S103). The playback control unit 309 also makes the playback start notification to the resident application (step S104).

Once playback reaches the mark information mk[5], the playback control unit 309 makes a mark passing event notification to the BD-J application (step S105).

The BD-J application receives the mark passing event notification and instructs the playback control unit 309 to draw the black screen (i.e., content mute) (step S106).

The playback control unit 309 receives a black-screen drawing instruction from the BD-J application and draws the black screen (step S107).

Upon reaching the end mark of chapter 5, which is the repeat end position, the playback control unit 309 makes an end notification to the BD-J application (step S108). The playback control unit 309 also makes the end notification to the resident application (step S109).

The BD-J application receives the end notification from the playback control unit 309 and makes an instruction to begin playback of the second playlist (step S110).

The playback control unit 309 receives the playback start instruction from the BD-J application and begins playback of the second playlist (step S111).

After beginning the playback of the second playlist, the playback control unit 309 makes a playback start notification to the BD-J application (step S112). The playback control unit 309 also makes the playback start notification to the resident application (step S113).

The BD-J application receives the playback start notification to the playback control unit 309, and instructs the playback control unit 309 to clear the black screen (i.e., to release the content mute) (step S114).

The playback control unit 309 receives the black-screen clear instruction from the BD-J application and clears the black screen (step S115).

Next, the processes performed during black-screen display and repeat playback are described.

Figure 21:
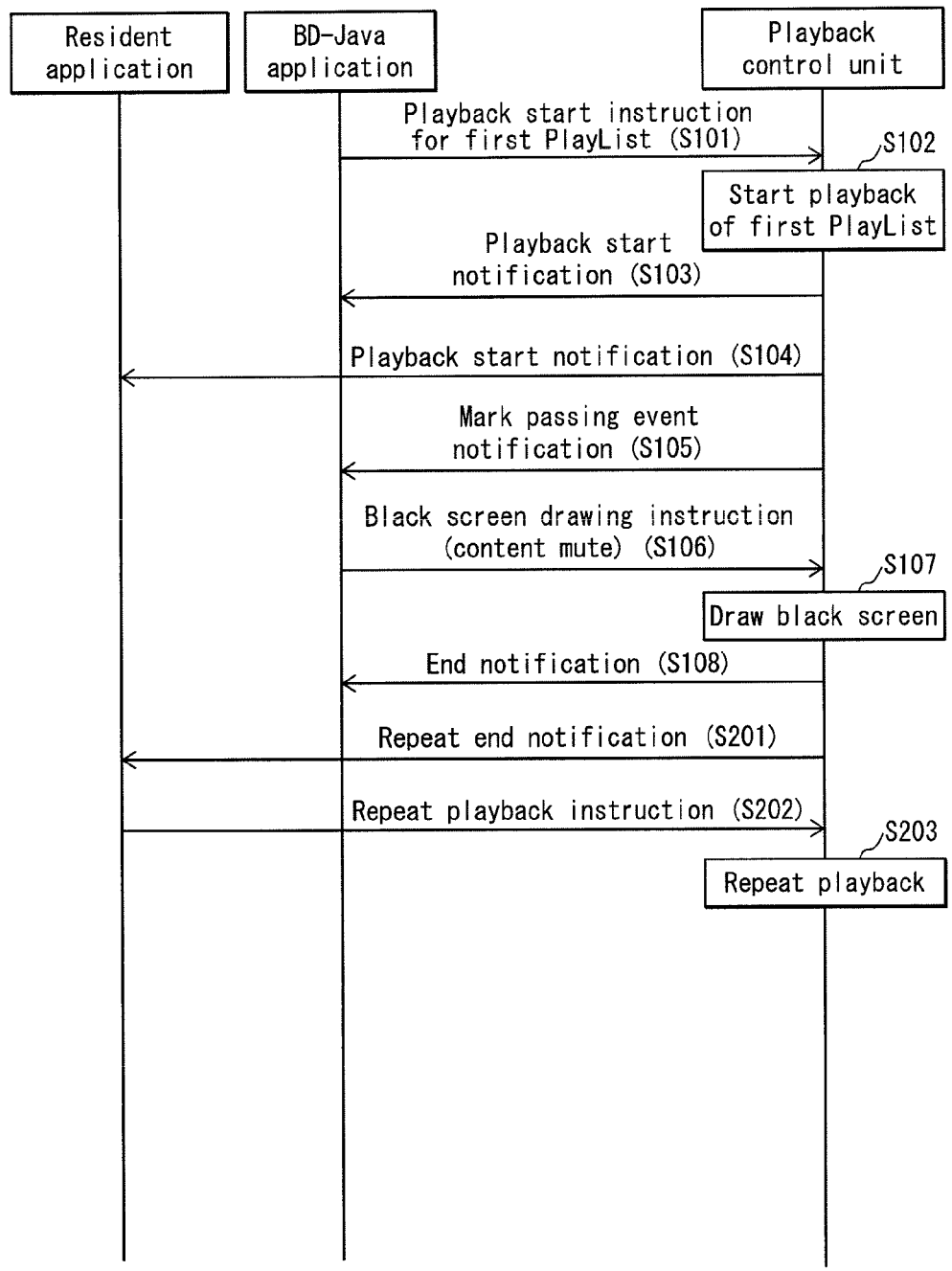
FIG. 21 is a sequence diagram indicating an operations flow performed by the resident application, the BD-J application, and the playback control unit when performing the black-screen display from FIG. 17 and the repeat playback.

FIG. 21 is a sequence diagram indicating the operations flow performed by the resident application, the BD-J application, and the playback control unit when performing the black-screen display from FIG. 17 and the repeat playback. Portions of the process identical to those from FIG. 20 use the same reference signs, and explanations thereof are omitted.

Upon reaching the end of chapter 5, which is the repeat end position, after the black-screen display of step S107, the playback control unit 309 makes a repeat end notification to the resident application (step S201).

The resident application receives the repeat end notification from the playback control unit 309 and instructs the playback control unit 309 to perform repeat playback (step S202).

The playback control unit 309 receives the repeat playback instruction from the resident application and begins repeat playback from chapter 1 (step S203).

As indicated by step S114 of FIG. 20, the BD-J application receives the playback start notification for the second playlist from the playback control unit, and instructs the playback control unit to clear the black screen (i.e., to release the content mute). However, in the process shown in FIG. 21, the second playlist is not initiated after reaching the end of chapter 5, in favour of beginning playback from chapter 1. Thus, the black screen is not cleared, and the black-screen display continues during the repeat playback from chapter 1.

As such, a conflict occurs between the repeat playback process by the playback device and the BD-J application executed using an event associated with the time closest to the end time of the repeat range, specifically an event associated with the end time of a playback interval for a playlist or chapter, as a trigger.

(4.2. Repeat Range Adjustment Details)

As a result of innovative research, the inventor discovered that stable repeat playback is realisable as follows, without conflict between the BD-J application and the repeat playback process by the playback device.

Figure 22A:
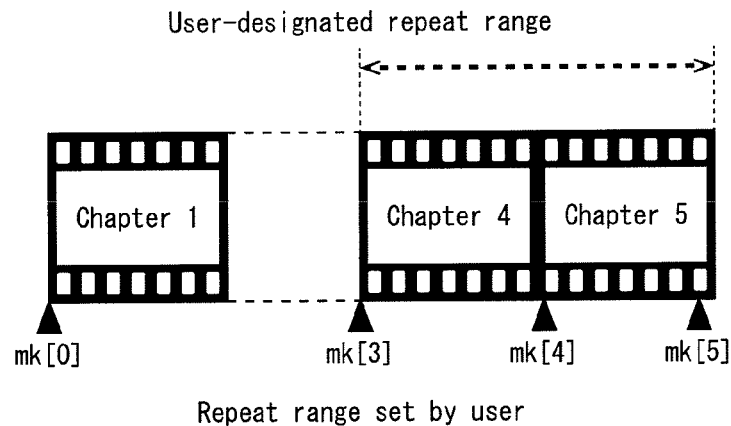
FIGS. 22A and 22B illustrate a repeat range adjustment made with reference to mark information.
Figure 22B:
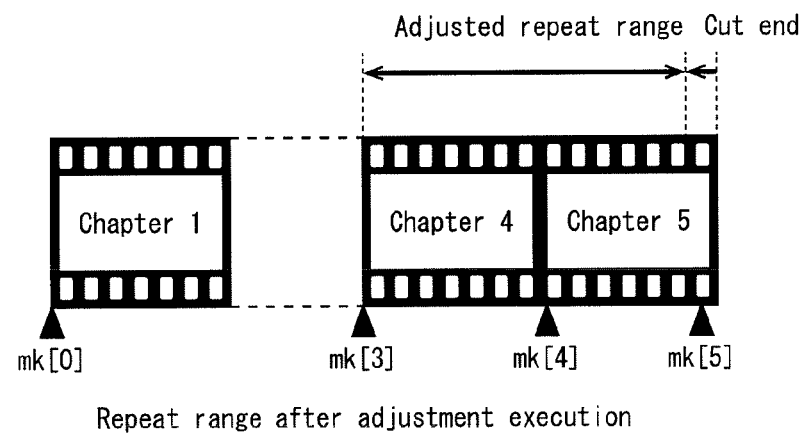

FIGS. 22A and 22B illustrate the repeat range adjustment made with reference to the mark information.

FIG. 22A indicates the repeat range designated by the user. In this example, the repeat playback is from chapter 4 to chapter 5.

FIG. 22B indicates the repeat range from FIG. 22A after the repeat range adjustment. As shown, the playback device 200 specifies mark information mk[5], which is associated with the position closest to the end of chapter 5 in the repeat range, and adjusts the end position of the repeat range to a time preceding mk[5]. Thus, stable repeat playback is realised without the BD-J application being executed at the mark information mk[5] trigger, and without any conflict between the repeat playback process by the playback device and the BD-J application.

Figure 23A:
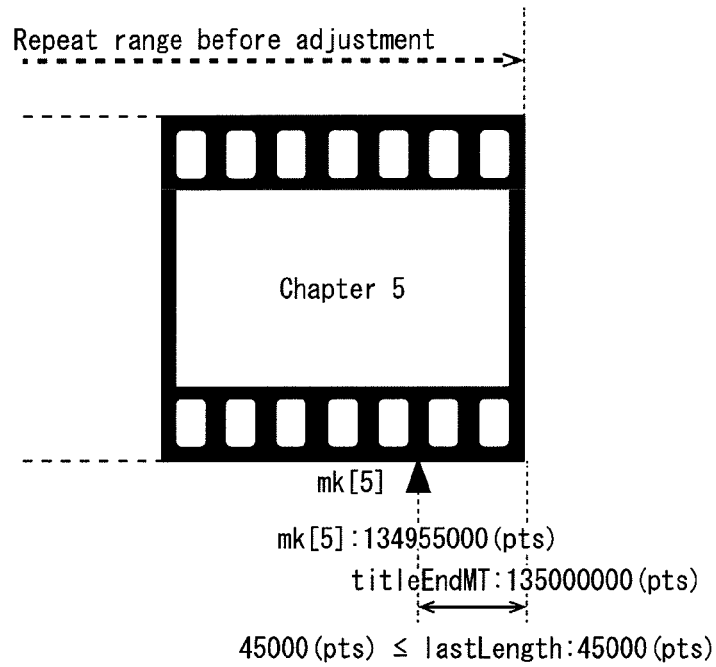
FIGS. 23A and 23B illustrate details of the repeat range adjustment made with reference to mark information.
Figure 23B:
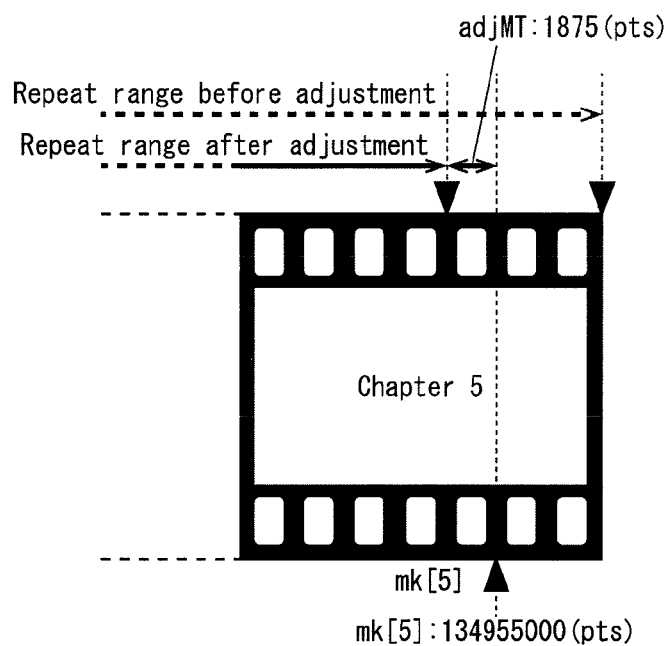

FIGS. 23A and 23B illustrate the details of the repeat range adjustment made with reference to the mark information.

FIG. 23A indicates the repeat range prior to the repeat range adjustment. In this example, the mark information mk[5] is associated with playback position 134955000 while the end of the title titleEndMT is playback position 135000000 (both PTS). The repeat range adjustment unit performs the repeat range adjustment when the interval between titleEndMT and mk[5] is equal to or shorter than the threshold lastLength. In the example, the interval between the end of the title titleEndMT and the mark information mk[5] (135000000-134955000) is equal to the threshold lastLength of 45000. Thus, the repeat range adjustment is performed.

FIG. 23B indicates the repeat range from FIG. 23A after the repeat range adjustment. In this example, the end position of the repeat range is adjusted ahead of the mark information mk[5] by the adjMT parameter of 1875 stored in the adjustment parameter memory unit 307.

Figure 24A:
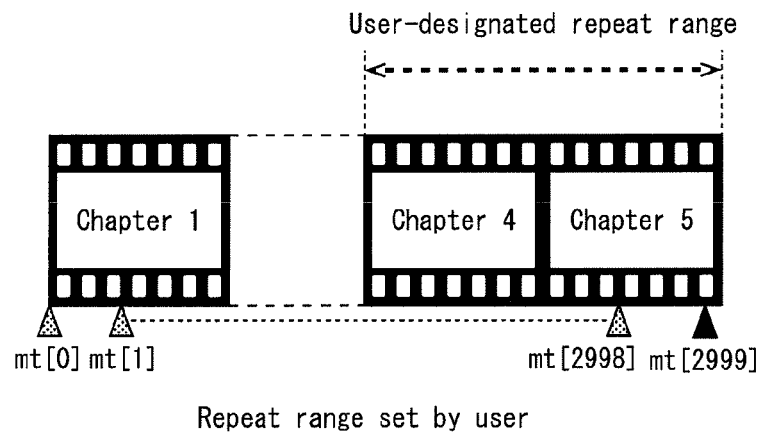
FIGS. 24A and 24B illustrate the repeat range adjustment made with reference to a media time event.
Figure 24B:
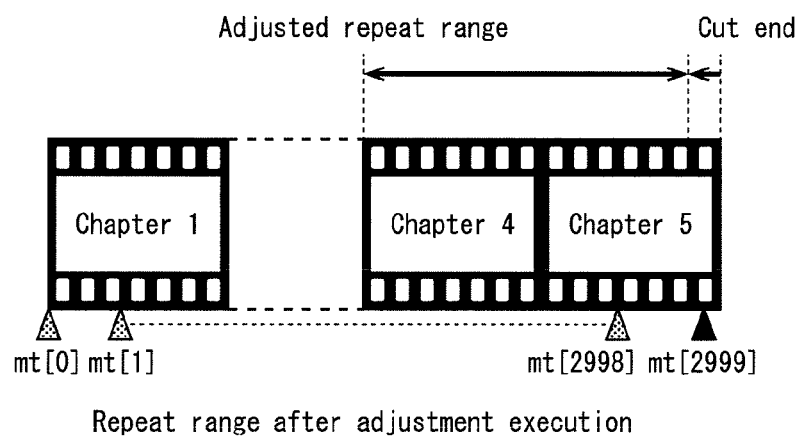

FIGS. 24A and 24B illustrate the repeat range adjustment made with reference to the media time event.

FIG. 24A indicates the repeat range designated by the user. In this example, the repeat playback is from chapter 4 to chapter 5.

FIG. 24B indicates the repeat range from FIG. 24A after the repeat range adjustment. As shown, the playback device 200 specifies media time event mt[2999], which is associated with the position closest to the end of chapter 5 in the repeat range, and adjusts the end position of the repeat range to a time preceding mt[2999]. Accordingly, stable repeat playback is realised without the BD-J application being executed at the media time event mt[2999] trigger, and without any conflict between the repeat playback process by the playback device and the BD-J application.

Figure 25A:
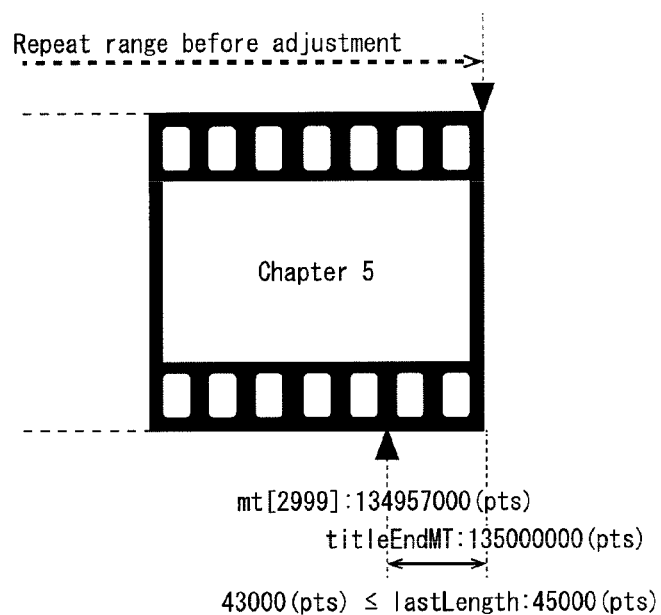
FIGS. 25A and 25B illustrate details of the repeat range adjustment made with reference to the media time event.
Figure 25B:
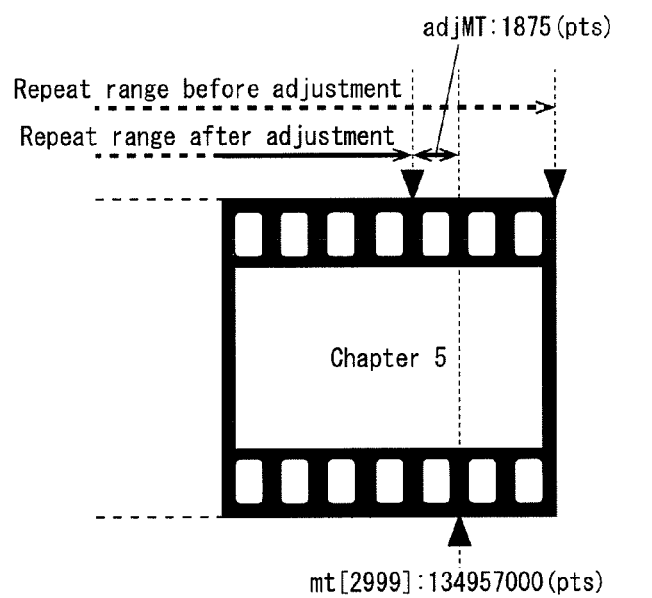

FIGS. 25A and 25B illustrate the repeat range adjustment made with reference to the media time event.

FIG. 25A indicates the repeat range prior to the repeat range adjustment. In this example, the media time event mt[2999] is associated with the playback position 134957000, while the end of the title titleEndMT is playback position 135000000. The repeat range adjustment unit performs the repeat range adjustment when the interval between titleEndMT and mk[2999] is equal to or shorter than the threshold lastLength. In the example, the interval between the end of the title titleEndMT and the media time event mt[2999] (135000000-134957000) is shorter than the threshold lastLength of 45000. Thus, the repeat range adjustment is performed.

FIG. 25B indicates the repeat range from FIG. 25A after the repeat range adjustment. In this example, the end position of the repeat range is adjusted ahead of the media time event mt[2999] by the adjMT parameter of 1875 stored in the adjustment parameter memory unit 307.

Figure 26:
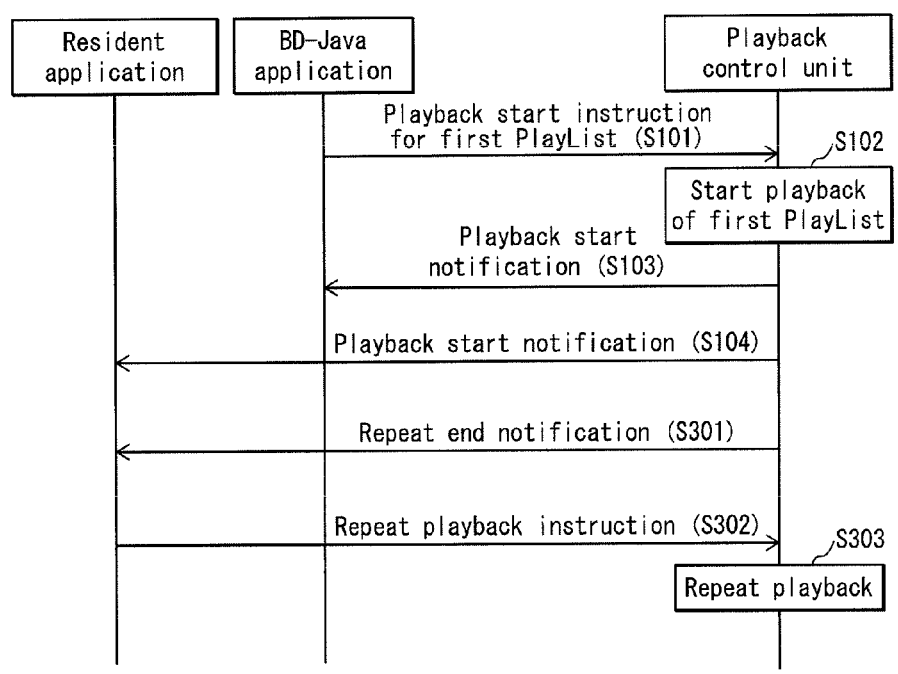
FIG. 26 is a sequence diagram indicating the processing flow performed by the resident application, the BD-J application, and the playback control unit when repeat playback is performed with the adjusted repeat range from FIGS. 22A, 22B, 23A, and 23B.

FIG. 26 is a flowchart indicating the processing flow performed by the resident application, the BD-J application, and the playback control unit when repeat playback is performed with the adjusted repeat range from FIGS. 22A, 22B, 23A, and 23B. Portions of the process identical to those from FIG. 20 use the same reference signs, and explanations thereof are omitted.

Upon reaching the end of chapter 5, which is the repeat end position, after the playback start notification of step S104, the playback control unit 309 makes a repeat end notification to the resident application (step S301).

The resident application receives the repeat end notification from the playback control unit 309 and instructs the playback control unit 309 to perform repeat playback (step S302).

The playback control unit 309 receives the repeat playback instruction from the resident application and begins repeat playback from chapter 1 (step S303).

Comparison to the flowchart of FIG. 21, in which the repeat range is not adjusted, reveals that the mark passing event notification of step S105 does not occur, because the end position of the repeat range has been adjusted to occur before the mark information mk[5]. Accordingly, stable repeat playback is realised without the black-screen drawing (i.e., content mute) instruction of step S106 and the black-screen processing of step S107, and without any conflict from the BD-J application.

Although the above explanations are given for a situation where the end position of the user-defined repeat range is the end of the playlist, the present disclosure is not limited to such circumstances. The user-defined repeat range may be any range.

Figure 27A:
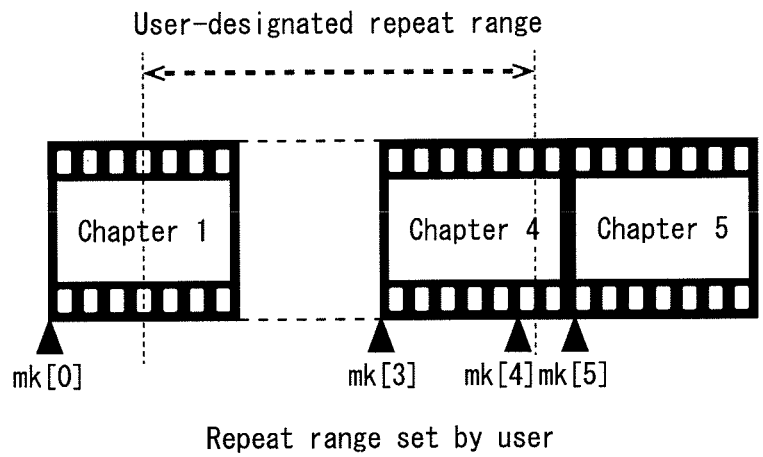
FIGS. 27A and 27B indicate repeat range adjustment when the repeat range extends from a point during chapter 1 to a point during chapter 4.
Figure 27B:
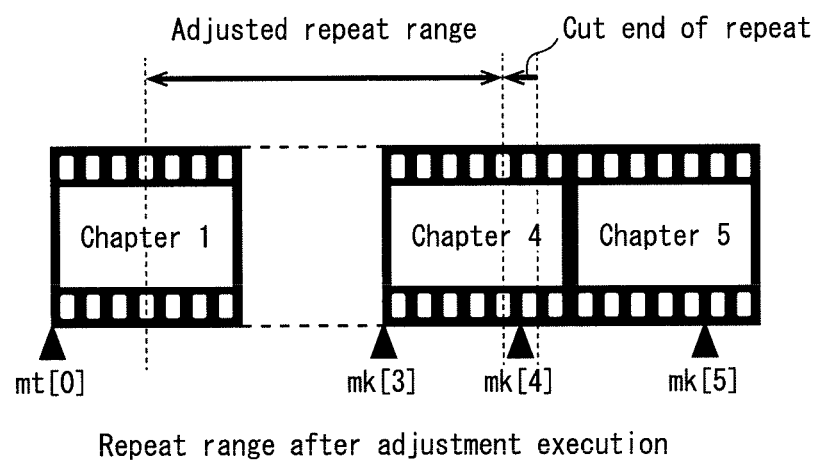

FIGS. 27A and 27B indicate repeat range adjustment for a situation where the repeat range extends from a point during chapter 1 to a point during chapter 4.

FIG. 27A indicates the repeat range designated by the user. The repeat playback occurs over a range from a point during chapter 1 to a point during chapter 4.

FIG. 27B indicates the repeat range from FIG. 27A after the repeat range adjustment. As shown, the playback device 200 specifies mark information mk[4], which is associated with the position closest to the end of the repeat range, and adjusts the end position of the repeat range to a time preceding mk[4]. Thus, stable repeat playback is realised without the BD-J application being executed at the mark information mk[4] trigger, and without any conflict between the repeat playback process by the playback device and the BD-J application.

Figure 28A:
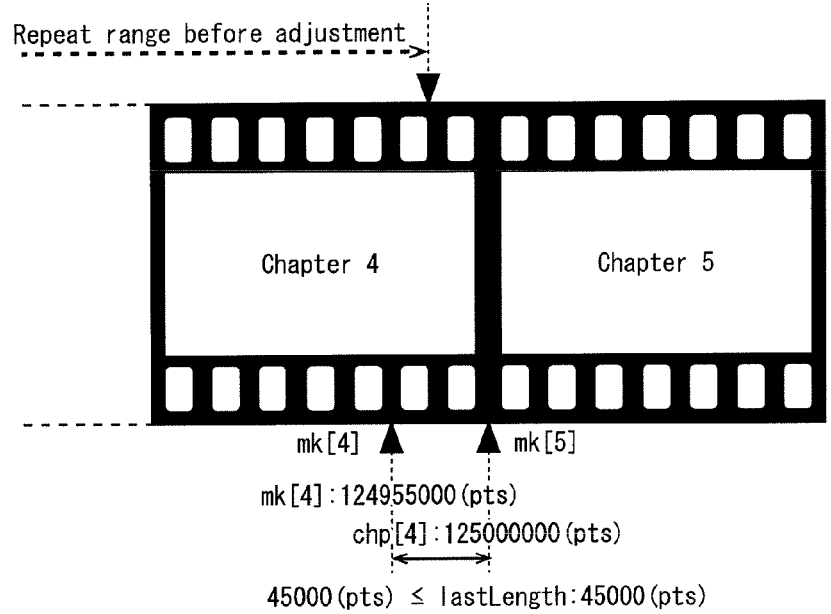
FIGS. 28A and 28B illustrate the details of the repeat range adjustment shown in FIGS. 27A and 27B.
Figure 28B:
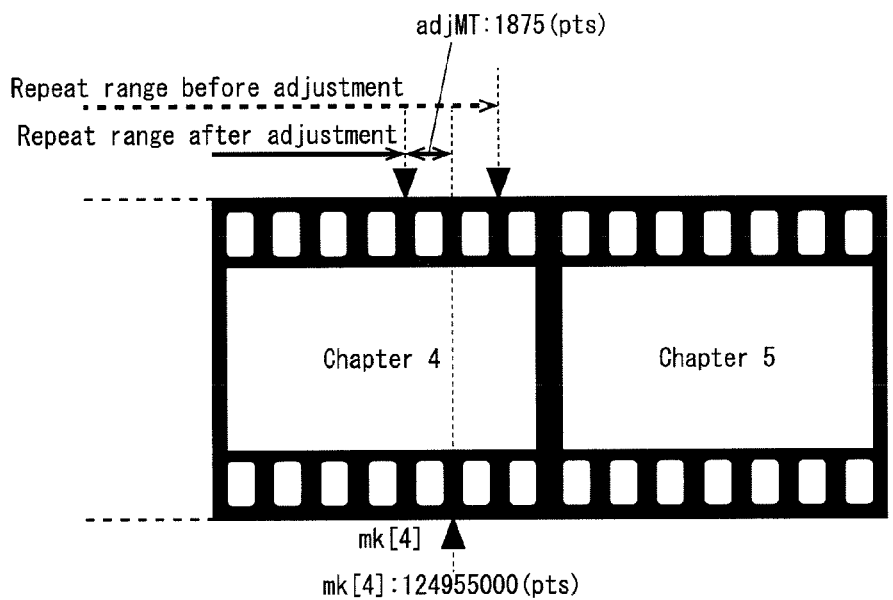

FIGS. 28A and 28B illustrate the details of the repeat range adjustment shown in FIGS. 27A and 27B.

FIG. 28A indicates the repeat range prior to the repeat range adjustment. In this example, the mark information mk[4] is associated with playback position 124955000 while the end of the playback interval is the end of chapter 4 chp[4], at playback position 125000000. The repeat range adjustment unit performs the repeat range adjustment when the interval between chp[4] and mk[4] is equal to or shorter than the threshold lastLength. In the example, the interval between the end of chapter 4 chp[4] and the mark information mk[4] (125000000-124955000) is equal to the threshold lastLength of 45000. Thus, the repeat range adjustment is performed.

FIG. 28B indicates the repeat range from FIG. 28A after the repeat range adjustment. In this example, the end position of the repeat range is adjusted ahead of the mark information mk[4] by the adjMT parameter of 1875 stored in the adjustment parameter memory unit 307.

This concludes the description of the repeat range adjustment. Next, the details of the playback device 200 operations are described.

(5. Operations)

(5.1 Repeat Playback Process)

Figure 29:
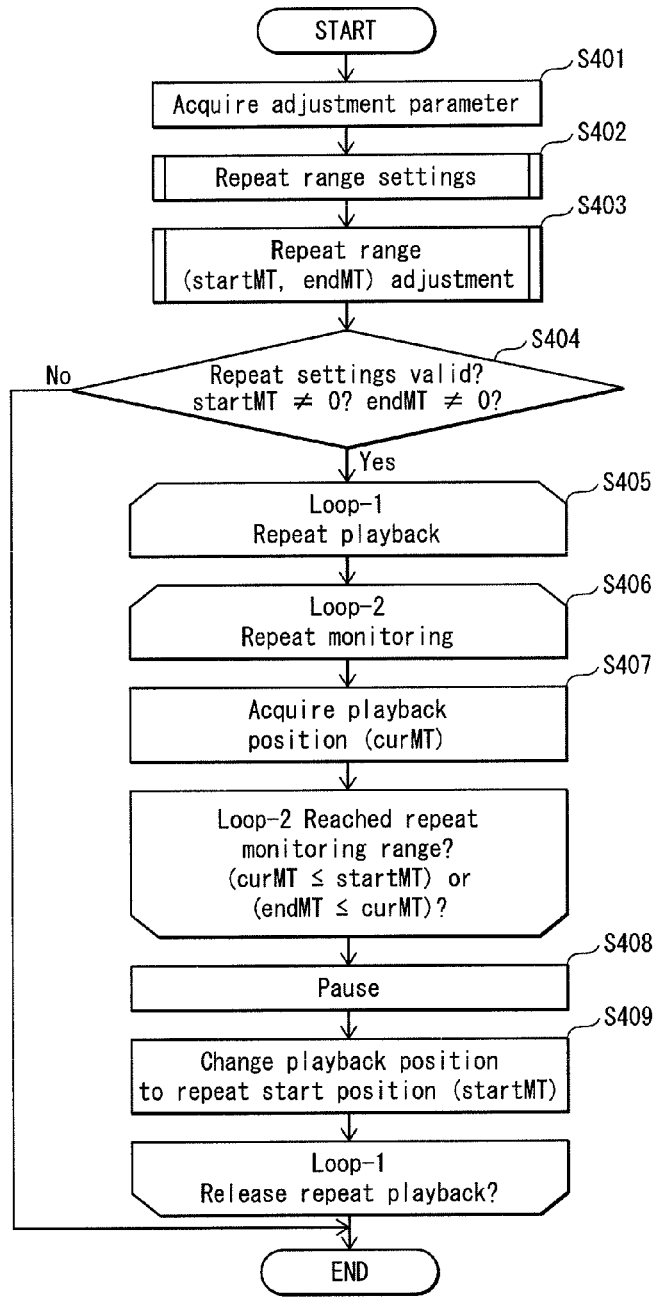
FIG. 29 is a flowchart of the repeat playback process.

First, the repeat playback process is described. FIG. 29 is a flowchart of the repeat playback process. As shown, the repeat range adjustment unit 306 acquires the adjustment parameter stored in the adjustment parameter memory unit 307 (step S401).

The repeat range acquisition unit 301 sets the repeat range (step S402). The details of this process are described later.

Then, the event specification unit event 302, the final mark determination unit 303, the final media time event specification unit 304, the repeat range adjustability determination unit 305, and the repeat range adjustment unit 306 perform the repeat range (i.e., startMT and endMT) adjustment (step S403). The details of this process are described later.

After the repeat range adjustment, the playback control unit 309 determines whether or not the repeat range is valid (step S404). Specifically, the playback control unit 309 determines whether or not the startMT and the endMT stored by the repeat range memory unit 308 are zero.

When the repeat range is invalid (Yes in step S404), the playback control unit 309 repeats steps S406 through S409 until repeat playback is cancelled (step S405).

Also, the playback control unit 309 performs repeat monitoring (step S406). Specifically, the playback control unit 309 confirms that the current playback position (curMT) has reached the repeat monitoring range. That is, the playback control unit 309 confirms whether the current playback position curMT is equal to or less than the repeat start position start MT, or is equal to or less than the repeat end position endMT. When the current playback position has not reached the repeat monitoring range, the playback position acquisition process of step S407 is repeated. When the current playback position has reached the repeat monitoring range, step S408 is performed.

When the current playback position has reached the repeat monitoring range, the playback control unit 309 pauses playback of the digital stream (step S408).

Then, the playback control unit 309 changes the playback position to the repeat start position startMT (step S409).

When the repeat range is not valid (No in step S404), the repeat playback process ends.

This concludes the description of the repeat playback process. Next, the details of the repeat range setting process of step S402 are described).

(5.2 Repeat Playback Setting Process)

Figure 30:
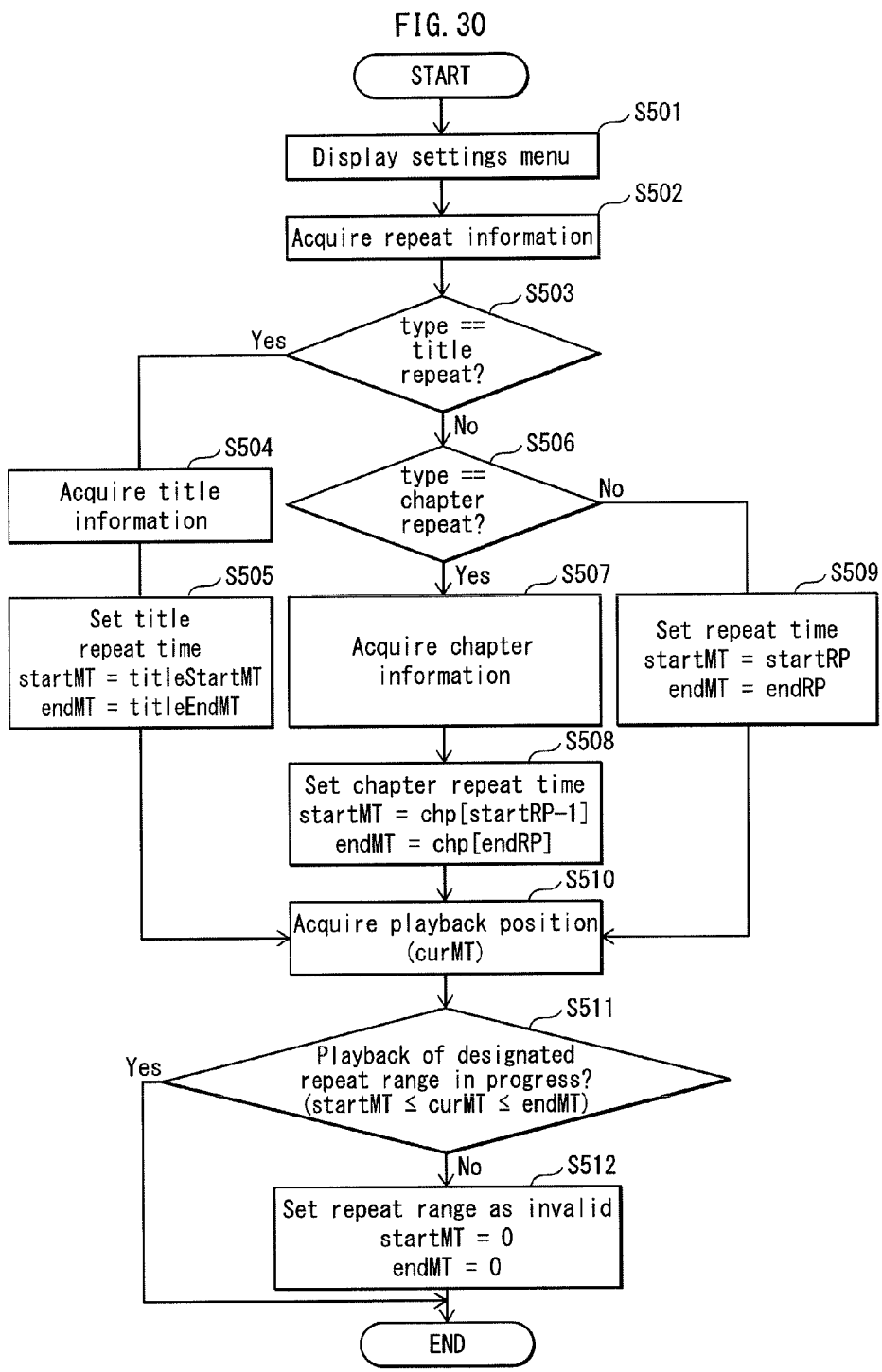
FIG. 30 is a flowchart of the repeat range setting process of step S402.

FIG. 30 is a flowchart of the repeat range setting process of step S402.

As shown, the repeat range acquisition unit 301 displays an OSD settings menu, similar to that of FIG. 11 (Step S501).

Then, the repeat range acquisition unit 301 acquires the repeat information from the operation input signal input by the user (Step S502).

After acquiring the repeat information, the repeat range acquisition unit 301 determines whether the repeat mode indicated by the repeat information is title repeat (step S503).

In the affirmative case (Yes in step S503), the repeat range acquisition unit 301 acquires the title information (step S504). Specifically, the repeat range acquisition unit 301 acquires the title start position titleStartMT and the title end position repeat range for the title currently being played back from the playlist information table shown in FIG. 12.

The repeat range acquisition unit 301 sets the values stored in the repeat range memory unit 308, specifically setting the repeat start position startMT with the value of the title start position titleStartMT, and the repeat end position endMT with the value of the title end position titleEndMT (step S505).

In the negative case (No in step S503), the repeat range acquisition unit 301 determines whether or not the repeat mode is chapter repeat (step S506).

In the affirmative case (Yes in step S506), the repeat range acquisition unit 301 acquires the chapter information (step S507). Specifically, the repeat range acquisition unit 301 acquires the chapter start position chp[startRP-1] and the chapter end position chp[endRP] from the playlist information shown in FIG. 12.

Then, the repeat range acquisition unit 301 sets the values stored in the repeat range memory unit 308, specifically setting the repeat start position startMT with the value of the chapter start position chp[startRP-1] and the repeat end position endMT with the value of the chapter end position chp[endRP] (step S508).

In the negative case (No in step S506), the repeat range acquisition unit 301 sets the repeat interval in the repeat range memory unit 308 (step S509). Specifically, the repeat range acquisition unit 301 sets the values stored in the repeat range memory unit 308, setting the repeat start position startMT with the value of the repeat start position startRP as the repeat start time input by the user and converted to a PTS, and setting the repeat end position endMT with the value of the repeat end position endRP as the repeat end time input by the user and converted to a PTS.

After any of steps S505, S508, and S509, the repeat range acquisition unit 301 acquires the current playback time (curMT) (step S510).

The repeat range acquisition unit 301 determines whether or not the current playback position is within the repeat interval (step S511). Specifically, the repeat range acquisition unit 301 determines whether the current playback position curMT is at or later than the repeat start position startMT, and at or earlier than the repeat end position endMT.

When the current playback position is not within the repeat range (No in step S511), the repeat range acquisition unit 301 determines that the repeat range is invalid (step S512). Specifically, the repeat range acquisition unit 301 sets the values stored in the repeat range memory unit 308, specifically setting the repeat start position startMT and the repeat end position endMT to zero.

When the current playback position is within the repeat range (Yes in step S511), the repeat range setting process concludes.

This concludes the description of the repeat range setting process. Next, the details of the repeat range adjustment process of step S403 are described.

(5.3. Repeat Range Adjustment Process)

Figure 31:
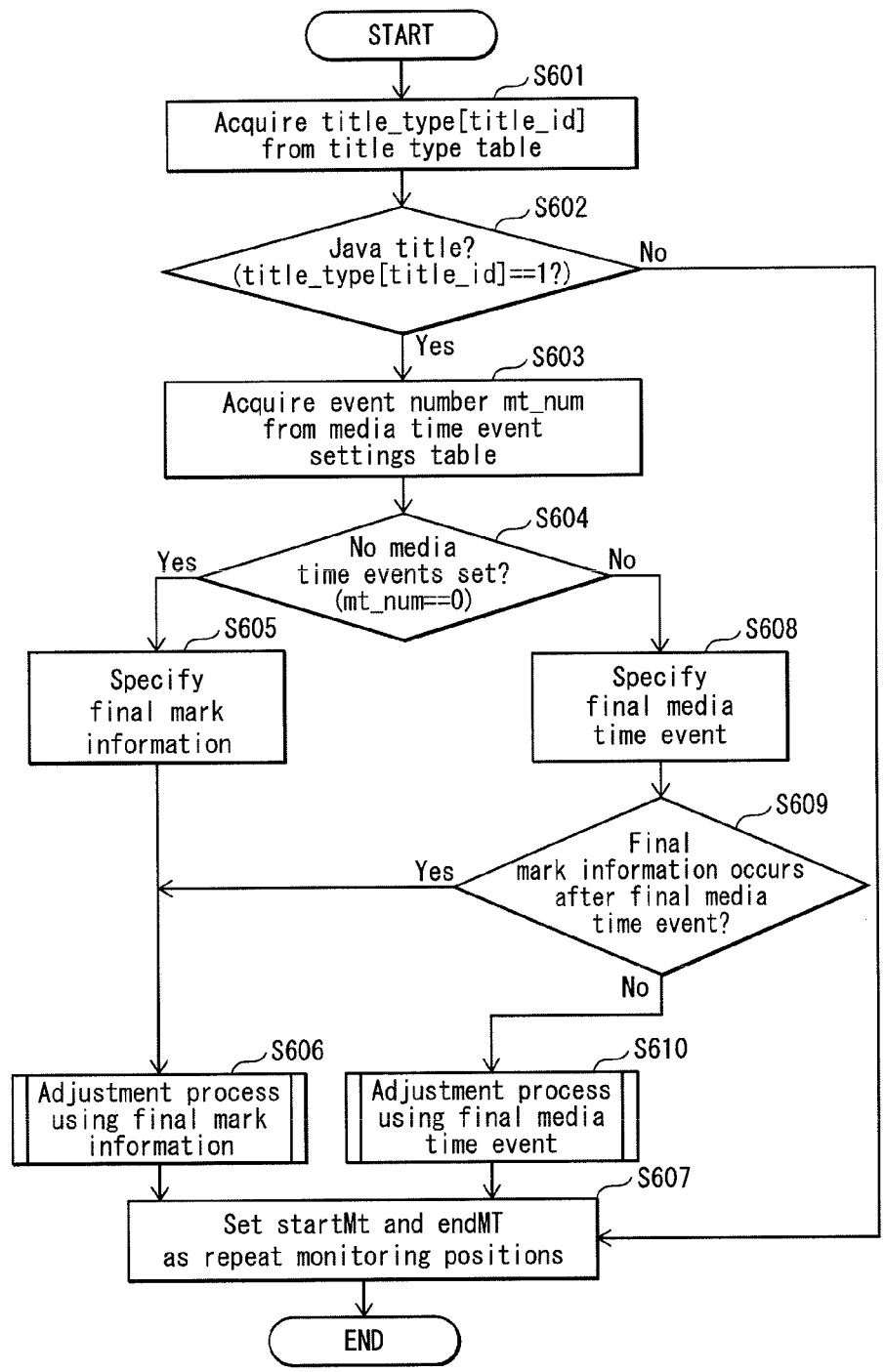
FIG. 31 is a flowchart of the repeat range adjustment process of step S403.

FIG. 31 is a flowchart of the repeat range adjustment process of step S403. As shown, the repeat range adjustment unit 306 acquires the title type for the current title from a title type table (step S601).

FIG. 32 indicates the content of a title type table. The title type table is included in the INDEX.BDMV file recorded on the BD-ROM as BD management information, indicated in FIG. 3. FIG. 32 represents the salient points thereof. As shown, the title_num field indicates the total number of titles recorded on the BD-ROM. The fields title_type[0] through title_type[998] are identifiers each designating a title as a Java title or as a movie title.

Here, a Java title is a title providing a service associated with content started by a Java application. Thus, a Java title is useable for changing the playback condition of content, using the marks and media time events within. Accordingly, there is a need to examine the positional relationship between the repeat range and the final mark or final media time event, and to adjust the end position of the repeat range.

The repeat range adjustment unit 306 references the title type acquired in step S601 and determines whether or not the title currently being played back is a Java title (step S602). Specifically, the repeat range adjustment unit title 306 determines whether the title indicated by the title type table (i.e., the title_id field) is a one.

When the title is not a Java title (No in step S602), the repeat range does not need to be adjusted, and thus no repeat range adjustment occurs.

When the title is a Java title (Yes in step S602), the event specification unit 302 acquires the total number of media time events mt_num from the media time event settings table (step S603).

The event specification unit 302 determines whether or not a media time event is set within the title (step S604). Specifically, the event specification unit 302 determines whether the value of the mt_field indicating the total number of media time events is zero.

When the title contains no media time events (Yes in step S604), the final mark determination unit 303 determines the final mark (step S605). Specifically, the final mark determination unit 303 specifies a piece of mark information (a final mark) that is within the repeat range acquired by the repeat range acquisition unit 301 and is associated with the timestamp closest to the end time of the repeat range.

After the final mark information has been specified, the repeat range adjustment unit 306 performs the repeat range adjustment using the final mark information (step S606). The details of this process are described later.

Then, the repeat range adjustment unit 306 stores the repeat start position startMT and the repeat end position endMT in the repeat range memory unit 308 as repeat monitoring positions (step S607).

When the title includes a media time event (No in step S604), the final media time event specification unit 304 specifies the final media time event (step S608). Specifically, the final media time event specification unit 304 specifies a media time event (the final media time event) that is within the repeat range acquired by the repeat range acquisition unit 301 and is associated with the timestamp closest to the end time of the repeat range.

After the final media time event has been specified, the event specification unit 302 determines whether or not the final mark information occurs later than the final media time event (step S609).

In the affirmative case (Yes in step S609), the repeat range adjustment process is performed using the final mark information from step S606.

In the negative case (No in step S09), the repeat range adjustment is performed using the final media time event (step S610). The details of this process are described later.

This concludes the description of the repeat range adjustment process. Next, the repeat range adjustment process using the final mark information from step S606 is described.

(5.4 Repeat Range Adjustment Process Using Final Mark Information)

Figure 33:
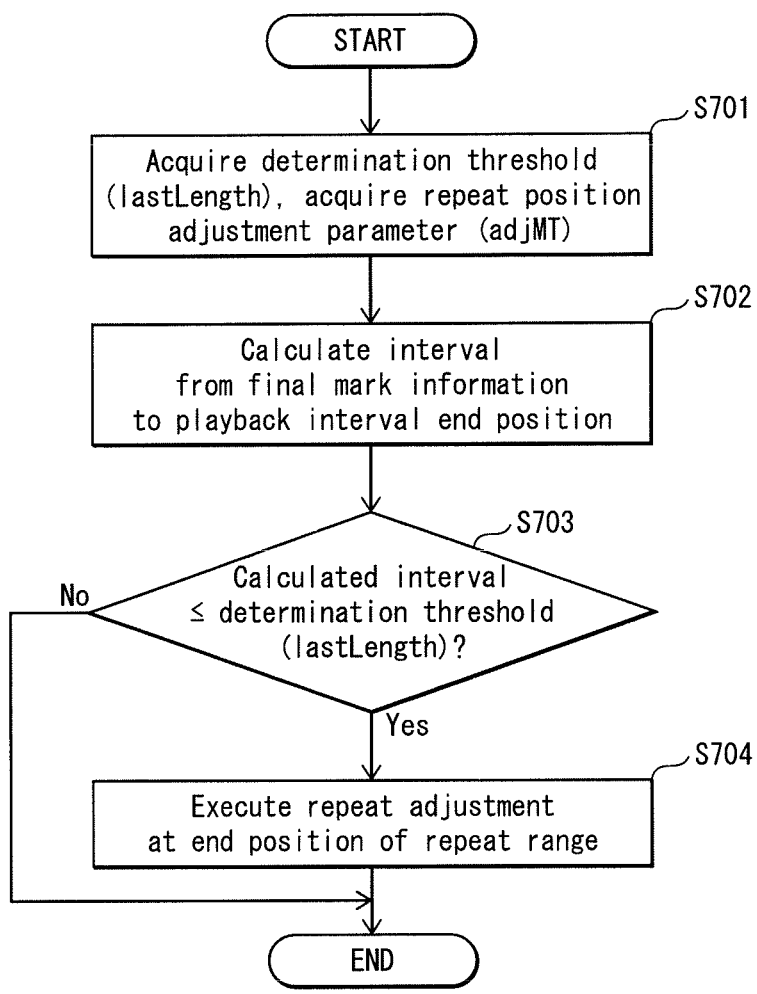
FIG. 33 is a flowchart of the repeat range adjustment process using the final mark information of step S606.

FIG. 33 is a flowchart of the repeat range adjustment process using the final mark information of step S606. As shown, the repeat range adjustment unit 306 acquires the determination threshold lastLength and the repeat position adjustment parameter adjMT from the adjustment parameter memory unit 307 (step S701).

Then, the repeat range adjustment unit 306 calculates an interval from the final mark information to the end position of the playback interval for the playlist or chapter (step S702).

The repeat range adjustment unit 306 determines whether or not the interval calculated in step S702 is equal to or shorter than the determination threshold lastLength (step S703).

In the affirmative case (Yes in step S703), the repeat range adjustment unit 306 performs the repeat adjustment process at the end position of the repeat range (step S704). Specifically, the end time of the repeat range is changed to a time that precedes the final mark information by the repeat position adjustment parameter adjMT.

In the negative case (No in step S703), the repeat range adjustment process with the final mark information is concluded.

This concludes the description of the repeat range adjustment process with the final mark information. Next, the repeat range adjustment process using the final media time event from step S610 is described.

(5.5 Repeat Range Adjustment Process Using Final Media Time Event)

Figure 34:
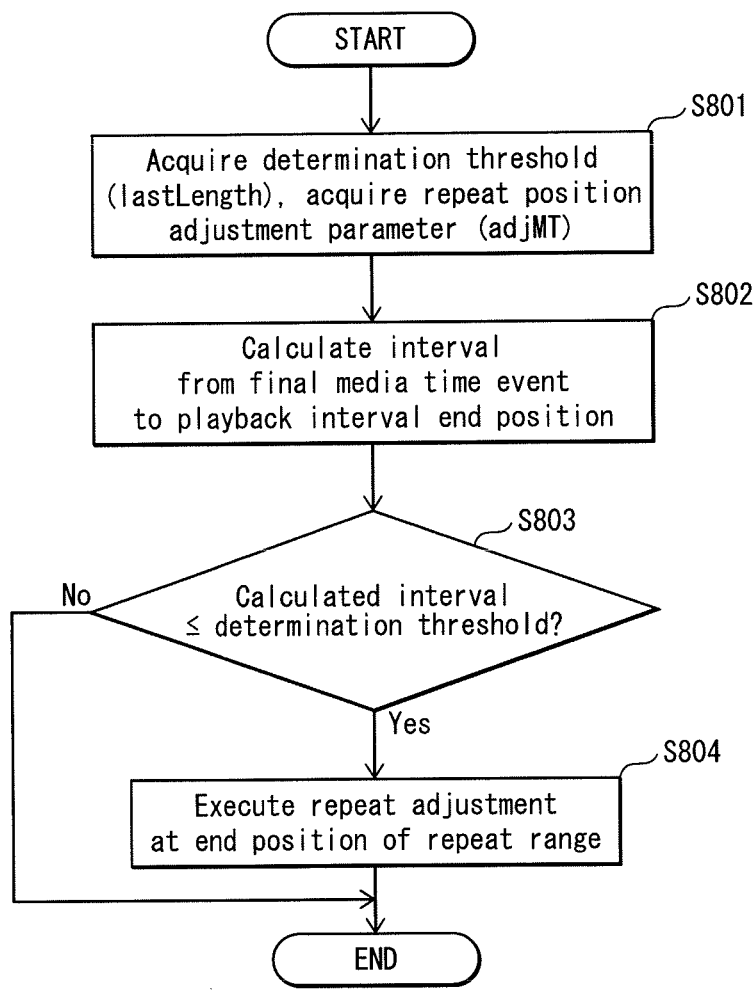
FIG. 34 is a flowchart of the repeat range adjustment process using the final media time event of step S610.

FIG. 34 is a flowchart of the repeat range adjustment process using the final media time event of step S610. As shown, the repeat range adjustment unit 306 acquires the determination threshold lastLength and the repeat position adjustment parameter adjMT from the adjustment parameter memory unit 307 (step S801).

Then, the repeat range adjustment unit 306 calculates an interval from the final media time event to the end position of the playback interval for the playlist or chapter (step S802).

The repeat range adjustment unit 306 determines whether or not the interval calculated in step S802 is equal to or shorter than the determination threshold lastLength (step S803).

In the affirmative case (Yes in step S803), the repeat range adjustment unit 306 performs the repeat adjustment process at the end position of the repeat range (step S804). Specifically, the end time of the repeat range is changed to a time that precedes the final mark information by the repeat position adjustment parameter adjMT.

In the negative case (No in step S803), the repeat range adjustment process with the final mark information ends.

According to the above-described Embodiment, stable repeat playback is realised without conflict between the application recorded on the recording medium and the repeat playback process by the playback device.

(Supplement)

Although the above description is given with reference to the Embodiment, no limitation to the above-described Embodiment is intended. The following variations are also included.

The steps of the method described in the above-described Embodiment may be written as a program and saved to memory, such that a CPU or similar reads the program from the memory and executes the program to execute the above-described method.

Also, the program may be stored on a computer-readable recording medium, such as a hard disk, an optical disc, or a semiconductor memory.

In addition, the program may be transmitted via a network, such as electrical signal lines, wireless or wired communication lines, or the Internet.

The above-described Embodiment may be realised as an LSI controlling the playback device. Such an LSI is realised by integrating functional blocks for each of the repeat range acquisition unit 301, the event specification unit 302, the final mark determination unit 303, the final media time event specification unit 304, the repeat range adjustability determination unit 305, the repeat range adjustment unit 306, the adjustment parameter memory unit 307, the repeat range memory unit 308 and the playback control unit 309 described above. These functional blocks may each be realised on an individual chip, or a single chip may include all or a subset of the functional blocks.

Although an LSI is named above, the names IC, system LSI, super LSI, and ultra LSI are all applicable according to the degree of integration.

The integrated circuit method is not limited to LSI. A private circuit or a general-purpose processor may also be applicable. After LSI manufacture, an FPGA (Field Programmable Gate Array) or reconfigurable processor may also be used.

Furthermore, future developments may lead to technology enhancing or surpassing LSI integrated circuit technology. Such developments may, of course, be applied to the integration of all functions. Such technology may also include applications in biotechnology.

Although the above Embodiment is described with reference to an example in which a Java application is recorded on the recording medium, no such limitation is intended. Rather than a Java application, another programming language such as B-Shell, Perl Script, ECMA Script, and so on may be used.

Although the above Embodiment describes the playback device as including an optical disc drive, no such limitation is intended. The optical disc drive may be replaced by a slot for inserting removable media, such as any of an SD memory card, a memory stick, contact Flash™, smart media, and multimedia cards, or by a USB slot or similar.

Although the present Embodiment is described as pertaining to a playback device only playing back a recording medium, no such limitation is intended. For example, a recording playback device having a recording function is also applicable.

In the above-described Embodiment, the repeat range acquisition unit 301 receives input of a repeat range from the user. However, no such limitation is intended. The input of the repeat range may also be input by another playback device, by a recording playback device, or similar.

Other variations are also applicable, in whole or in part, to the above-described Embodiment.

INDUSTRIAL APPLICABILITY

The playback device of the present disclosure is applicable to viewing video in a home theatre system, for example.

REFERENCE SIGNS LIST

100 Recording medium
200 Playback device
201 Optical disc drive
202 Decoder
203 Video plane
204 Image plane
205 Operation receiver
206 Controller
207 Rendering engine
208 Adder
209 Transmitter
300 Control device
301 Repeat range acquisition unit
302 Event specification unit
303 Final mark determination unit
304 Final media time event specification unit
305 Repeat range adjustability determination unit
306 Repeat range adjustment unit
307 Adjustment parameter memory unit
308 Repeat range memory unit
309 Playback control unit
310 Application execution unit
400 Display device

The invention claimed is:

1. A playback device performing playback of a digital stream and executing an application, the digital stream and the application being included in a title recorded on a recording medium, the title having a plurality of events for executing the application in the digital stream,
the playback device comprising:
a processor; and
a memory storing instructions that, when executed by the processor, cause the processor to perform operations including:
receiving an input of a repeat range pertaining to the digital stream;
specifying an event of the plurality of events that is within the input repeat range and is associated with a time closest to an end time of the repeat range;
creating an adjusted repeat range by adjusting the end time of the repeat range to a time preceding the time of the specified event; and
performing repeat playback of the digital stream over the adjusted repeat range.

2. The playback device of claim 1, wherein
a playback interval is defined on the digital stream, and
the adjusting executes the adjustment when an interval from the time of the specified event to an end time of the playback interval is equal to or shorter than a predetermined interval.

3. The playback device of claim 1, wherein
the adjusting adjusts the end time of the repeat range to the time preceding the time of the specified event by at least an interval required for beginning playback of the digital stream from a start time of the repeat range after playing back of the digital stream to the end time of the repeat range.

4. The playback device of claim 1, wherein
the adjusting adjusts the end time of the repeat range to the time preceding the time of the specified event by at least an interval required for pausing playback of the digital stream after playing of the digital stream to the end time of the repeat range.

5. The playback device of claim 3, wherein
the memory further stores a parameter indicating an interval from the time of the specified event to the end time of the adjusted repeat range.

6. The playback device of claim 1, wherein
each of the events is associated with a time in a playback interval of the digital stream, and the recording medium includes mark information indicating a predetermined position in the digital stream and a media time event providing a notification to the application when a playback timestamp of the digital stream reaches the time associated with the event.

7. The playback device of claim 1,
wherein the processor, executing the instructions, executes the application during a playback interval of the digital stream.

8. The playback device of claim 1, wherein a device-specific application is recorded in the playback device, and the processor, executing the instructions, further provides
a notification of reaching the end time of the repeat range to the device-specific application when a playback time of the digital stream reaches the end time of the adjusted repeat range,
upon receiving the notification, the device-specific application provides an instruction to begin playback of the digital stream from the start time of the repeat range, and
the processor, executing the instructions, begins
playback of the digital stream from the start time of the repeat range in accordance with the instruction from the device-specific application.

9. The playback device of claim 1,
wherein the processor, executing the instructions, verifies the events within the input repeat range, and specifies the event associated with the time closest to the end time of the repeat range, among the verified events.

10. A playback method of performing playback of a digital stream and executing an application, the digital stream and the application being included in a title recorded on a recording medium,
the title having a plurality of events for executing the application in the digital stream,
the playback method comprising:
receiving an input of a repeat range pertaining to the digital stream;
specifying an event of the plurality of events that is within the input repeat range and is associated with a time closest to an end time of the repeat range;
creating an adjusted repeat range by adjusting the end time of the repeat range to a time preceding the time of the specified event; and
performing repeat playback of the digital stream over the adjusted repeat range.

11. An integrated circuit performing playback of a digital stream and executing an application, the digital stream and the application being included in a title recorded on a recording medium,
the title a plurality of events set for executing the application during the digital stream,
the integrated circuit comprising:
a processor; and
a memory storing instructions that, when executed by the processor, cause the processor to perform operations including:
receiving an input of a repeat range pertaining to the digital stream;
specifying an event of the plurality of events that is within the repeat range and is associated with a time closest to an end time of the input repeat range;
creating an adjusted repeat range by adjusting the end time of the repeat range to a time preceding the time of the specified event; and
performing repeat playback of the digital stream over the adjusted repeat range.

12. A non-transitory computer readable recording medium storing a program causing a computer to perform playback of a digital stream and execution of an application, the digital stream and the application being included in a title recorded on a recording medium,
the title having a plurality of events set therein for executing the application in the digital stream,
the program causing the computer to perform operations including:
receiving an input of a repeat range pertaining to the digital stream;
specifying an event of the plurality of events that is within the repeat range and is associated with a time closest to an end time of the input repeat range;
creating an adjusted repeat range by adjusting the end time of the repeat range to a time preceding the time of the specified event; and
performing repeat playback of the digital stream over the adjusted repeat range.

* * * * *